US007096486B1

(12) United States Patent
Ukai et al.

(10) Patent No.: US 7,096,486 B1
(45) Date of Patent: Aug. 22, 2006

(54) TV PROGRAM SELECTION SUPPORT SYSTEM

(75) Inventors: Hiromi Ukai, Sagamihara (JP); Yuichi Yagawa, Yokohama (JP); Katsuhiko Abe, Tokorozawa (JP); Hideo Nishijima, Hitachinaka (JP); Hitoaki Owashi, Yokohama (JP); Yoshiyuki Azuma, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/337,530

(22) Filed: Jun. 22, 1999

(30) Foreign Application Priority Data

Jun. 26, 1998 (JP) ............................... 10-179992

(51) Int. Cl.
*H04N 4/445* (2006.01)

(52) U.S. Cl. ............................ 725/58; 725/44; 725/45; 725/134; 725/50; 386/46; 386/83

(58) Field of Classification Search ................. 725/14, 725/20, 45, 46, 50, 68, 131, 139, 151; 386/86
See application file for complete search history.

(56) References Cited

U.S. PATENT DOCUMENTS

| 5,223,924 | A | * | 6/1993 | Strubbe ......................... 725/46 |
| 5,400,402 | A | * | 3/1995 | Garfinkle ...................... 380/231 |
| 5,410,344 | A | * | 4/1995 | Graves et al. ................. 725/46 |
| 5,635,989 | A | * | 6/1997 | Rothmuller ................... 725/46 |
| 5,734,444 | A | * | 3/1998 | Yoshinobu ..................... 725/14 |
| 5,758,259 | A | * | 5/1998 | Lawler ........................... 725/45 |
| 5,798,785 | A | * | 8/1998 | Hendricks et al. ............ 725/46 |
| 5,867,205 | A | * | 2/1999 | Harrison ........................ 735/38 |
| 5,867,226 | A | * | 2/1999 | Wehmeyer et al. ............ 725/46 |
| 6,005,597 | A | * | 12/1999 | Barrett et al. ................. 725/46 |
| 6,088,722 | A | * | 7/2000 | Herz et al. ................... 709/217 |
| 6,185,360 | B1 | * | 2/2001 | Inoue et al. ................... 386/46 |
| 6,208,799 | B1 | * | 3/2001 | Marsh et al. .................. 386/83 |
| 6,240,555 | B1 | * | 5/2001 | Shoff et al. .................. 725/110 |
| 6,304,714 | B1 | * | 10/2001 | Krause et al. ................. 386/52 |
| 6,337,715 | B1 | * | 1/2002 | Inagaki et al. .............. 348/553 |
| 6,344,878 | B1 | * | 2/2002 | Emura ......................... 348/460 |
| 6,507,951 | B1 | * | 1/2003 | Wugofski ..................... 725/59 |
| 6,614,987 | B1 | * | 9/2003 | Ismail et al. .................. 386/83 |

FOREIGN PATENT DOCUMENTS

WO    WO 9222983 A2 * 12/1992

OTHER PUBLICATIONS

T. Murata, "Digital Broadcasting Receiver", Eizou Media Gakkai-shi, vol. 51, No. 9, 1997, pp. 1364-1369.
T. Isobe, "Intelligent Receiver", Eizou Media Gakkai-shi, vol. 51, No. 9, 1997, pp. 1377-1380.

* cited by examiner

*Primary Examiner*—Jason P. Salace
(74) *Attorney, Agent, or Firm*—Mattingly, Stanger, Malur & Brundidge, P.C.

(57) ABSTRACT

A TV program selection support system selects only programs suiting viewer's preference or necessary for a viewer from a large number of programs to be broadcast and proposes the selected programs to the viewer. The TV program selection support system comprises a program receiver for receiving broadcast TV programs, an EPG receiver for receiving an electronic program table listing TV programs, an EPG storage device for storing an EPG received by the EPG receiver, an operating means to be operated by the viewer to select a program from the stored electronic program table, a program selection support program for determining viewer's view tendency by analyzing the operation made by the viewer, creating an electronic program table on the basis of the view tendency and displaying the created electronic program table.

22 Claims, 23 Drawing Sheets

| | | 123xxx<br>CHANNEL 1 | 246yy<br>CHANNEL 2 | ... |
|---|---|---|---|---|
| 301 | CHANNEL/<br>CHANNEL NAME | | | |
| 302 | PROGRAM NAME | X TIME | YY INFORMATION STATION | ... |
| 303 | BROADCASTING DATE AND TIME — YEAR | 1997 | 1997 | ... |
| | MONTH | DEC. | DEC. | ... |
| | DATE | 21 | 21 | ... |
| | TIME | 18:00 | 18:05 | ... |
| | DAY | SUN. | SUN. | ... |
| 304 | TIME PERIOD (MIN) | 60 | 115 | ... |
| 305 | GENRE | NEWS / GENERAL | NEWS / DOMESTIC, VARIETY / GOURMET | ... |
| 306 | PURCHASE PRICE | 0 | 100 | ... |
| 307 | SOUND AND LANGUAGE | BILINGUAL | STEREOPHONIC | ... |
| 308 | BROADCASTING MODE | SIGN LANGUAGE | TELETEXT | ... |
| 309 | PROGRAM INFORMATION | GENERAL NEWS ABOUT POLITICS, AFFAIRS AND ACCIDENTS IS EXPLAINED. | PROGRAMS PRODUCED BY THE NETWORK OF LOCAL BROADCASTING STATIONS ARE BROADCAST. "TODAY'S LOCAL DISHES" IS A POPULAR PROGRAM | ... |
| 310 | PERSON'S NAME | aaa<br>bbb | ccc<br>ddd | ... |
| 311 | KEYWORD | POLITICS, AFFAIR, ACCIDENT, GENERAL NEWS | DOMESTIC, LOCAL, BROADCASTING STATION, LOCAL DISHES, CORNER, POPULARITY | ... |
| 312 | SERIAL NUMBER | FINAL | 24 | ... |
| 313 | PREFERENCE MEASURE | | | |

| | PROGRAM NAME (402) | PROGRAM END TIME (403) | VIEW TIME PERIOD (MIN) (404) |
|---|---|---|---|
| → (401 VIEW PROGRAM POINTER) X TIME | 19:00 | 48 |
| | YY INFORMATION STATION | 20:00 | 42 |
| | HITACHI NEWS 21 | VIDEO | 60 |

| PROGRAM NAME (501) | FIRST VIEW SCORE (502) | SECOND VIEW SCORE (503) | ... | PROGRAM VIEW MEASURE (504) |
|---|---|---|---|---|
| X TIME | 1.0 | 0.8 | ... | 0.6 |
| YY INFORMATION STATION | 0.5 | 0.7 | ... | 0.8 |
| ... | ... | ... | ... | ... |

FIG. 6

| | VIEW ELEMENTS | | TOTAL VIEW SCORE | NUMBER OF PROGRAMS | SPECIFIC VIEW SCORE |
|---|---|---|---|---|---|
| GENRE | MOVIE | ACTION FILM | 7.2 | 19 | 0.379 |
| | | ... | ... | ... | ... |
| | SPORT | BASEBALL | 30.6 | 66 | 0.464 |
| | | SOCCER | 45.2 | 51 | 0.886 |
| | | ... | ... | ... | ... |
| TIME | 0:00~ | | 3.4 | 55 | 0.007 |
| | 2:00~ | | 0.5 | 33 | 0.015 |
| | ... | | ... | ... | ... |
| TIME PERIOD | 0~15 | | 36.6 | 72 | 0.508 |
| | 16~30 | | 0.9 | 101 | 0.009 |
| | ... | | ... | ... | ... |
| DAY | SUN. | | 24.4 | 537 | 0.045 |
| | MON. | | 11.9 | 552 | 0.022 |
| | ... | | ... | ... | ... |
| PERSON'S NAME | a | | 4.8 | 6 | 0.800 |
| | b | | 3.1 | 5 | 0.620 |
| | ... | | ... | ... | ... |
| SOUND AND LANGUAGE | SOUND MULTIPLEX | | 27.4 | 355 | 0.077 |
| | BILINGUAL | | 18.8 | 235 | 0.080 |
| | ... | | ... | ... | ... |
| SERIAL NUMBER | NONSERIAL | | 27.7 | 339 | 0.081 |
| | SERIAL | 1st | 17.1 | 31 | 0.552 |
| | | ... | ... | ... | ... |
| | | FINAL | 26.5 | 59 | 0.449 |
| KEYWORD | TOKYO DOME | | 19.4 | 33 | 0.588 |
| | ANIMAL | | 17.3 | 54 | 0.320 |
| | YOKOHAMA | | 9.7 | 107 | 0.090 |
| | ... | | ... | ... | ... |
| PRICE | 0~200 | | 8.3 | 34 | 0.244 |
| | ... | | ... | ... | ... |
| CHANNEL | 1 | | 56.3 | 504 | 0.112 |
| | 2 | | 9.6 | 231 | 0.042 |
| | ... | | ... | ... | ... |

FIG. 7

| VIEW ELEMENTS | SPECIFIC VIEW SCORE |
|---|---|
| 703 — WEIGHTED PROGRAM VIEW MEASURE | 3.200 |
| 704 — GENRE / SUBGENRE | 0.232 |
| 705 — TIME | 0.033 |
| 706 — TIME PERIOD | 0.019 |
| 707 — DAY | 0.031 |
| 708 — PERSON'S NAME | 0.667 |
| 709 — SOUND AND LANGUAGE | 0.058 |
| 710 — SERIAL NUMBER | 0.066 |
| 711 — KEYWORD HIT POINT | 0.864 |
| 712 — PRICE | 0.047 |
| 713 — CHANNEL | 0.159 |
| 714 — TOTAL VIEW SCORE | 5.376 |

| PRESETTING ELEMENTS (801) | LISTS (802) |
|---|---|
| 803 — PROGRAM | POINTER INDICATING A PROGRAM CORRESPONDING TO THE PROGRAM VIEW DATABASE |
| 804 — PROGRAM NAME | LIST OF PROGRAMS |
| 805 — KEYWORD | LIST OF KEYWORDS |
| 806 — PERSON'S NAME | LIST OF PERSON'S NAMES |

| BROADCAST-ING DATE | CHANNEL / CHANNEL NAME | START TIME | END TIME | PROGRAM NAME | PRESETTING METHOD |
|---|---|---|---|---|---|
| 1997.12.30 | 123xx / CHANNEL 1 | 21:00 | 22:00 | HITACHI NEWS | A (82) |
| 1997.12.30 | 543x / CHANNEL 5 | 22:00 | 22:30 | SPORTS TOPICS | UK |
| 1997.12.30 | 333xx / CHANNEL 3 | 22:30 | 23:00 | MUSIC FOR TODAY | UN |
| ... | ... | ... | ... | ... | ... |

1801　1802　1803　1804　1805　1806

TV PROGRAM SELECTION SUPPORT SYSTEM

BACKGROUND OF THE INVENTION

The present invention relates to a method of supporting a TV (television) viewer for TV program selection and, more particularly, to a method suitable for a viewer to select a desired program among many programs progressively increasing with the increase of TV broadcasting channels caused by the development of digital TV broadcasting techniques, and a system for carrying out the method.

Methods by which TV viewers select TV programs are classified roughly into three groups.

Method 1) This method enables a viewer to obtain information about programs from TV program lists and program information provided in newspapers and magazines or program information heard from other persons, to select a desired program with reference to the information, to set a TV set for broadcasting date and time when the selected program is to be broadcast and a channel through which the selected program is to be broadcast, and to view the selected program. This method is used also to view a desired program by presetting the desired program for recording by a TV or by presetting the desired program for recording by a video recorder.

Method 2) This method enables a viewer to change the channels of a TV set so that programs being broadcast are displayed one after another to enable the viewer to search for a desired program.

Method 3) A broadcasting system using a communication satellite broadcasts an electronic program guide called an EPG. A program list can be viewed on the screen of a TV set through a device having an electronic program guide receiving function. This method enables a viewer to select a desired program by specifying a program name displayed on the screen of the TV set without specifying a channel through which the program of the specified program is broadcast. Techniques relating to this method is mentioned in "Eizou Media Gakkai-shi", Vol. 51, No. 9, pp. 1364(30)–1369(35) (1997). Electronic program guide is able to display only viewer's favorite channels or programs classified by genre.

If digital TV broadcasting becomes prevalent and programs are broadcast through more than one hundred channels, the number of programs which can be viewed by viewers increases. Consequently, the amount of program information provided in newspapers and magazines becomes enormous, and booklets containing program lists and program information will become considerably thick. Under such circumstances, it is very difficult for the viewers to select only necessary information from program information provided in the conventional newspapers and magazines. When selecting a desired program by the method which enables a viewer to change the channels of a TV set so that programs being broadcast are displayed one after another to enable the viewer to search for a desired program, the viewer memorizes the contents of a plurality of desired programs, compares the contents and selects one of the desired programs. It is known that human beings are able to memorize about seven pieces of information for a short period of time. Therefore, it is very difficult for a viewer to memorize the contents of successively viewed programs when the channels increases.

The method 3) using EPG is able to solve the problem of the thick booklet but the same cannot solve problem of difficulty in selecting a desired program from many programs. Even if the number of channels is as small as ten channels or below through which ground waves can be received by TV sets, many people have regretful experiences of having failed to notice program lists, of obtaining information about programs after programs have been broadcast, of failing in viewing programs and of forgetting recording programs.

SUMMARY OF THE INVENTION

Accordingly, it is an object of the present invention to provide a method of supporting a viewer for selecting a desired program among many programs, and a system for carrying out the method. It is another object of the present invention to provide a method and a system which allow a viewer to view a program even when the viewer will not fail in viewing the program.

With the foregoing object in view, the present invention provides a TV program selection support method comprising recording a viewer's view history, analyzing the view history, presuming viewer's favorite programs from program data provided in available electronic program lists and data obtained through the analysis of the view history, and informing the viewer of the results of presumption, and a TV program selection support system for carrying out the TV program selection support method. The TV program selection support system comprises a program recording means for automatically recording a program presumed to be a viewer's favorite program.

Since a program presumed to be a viewer's favorite program is determined and the viewer is informed of the result of presumption, the viewer is able to select a desired program without viewing all the programs and viewer's program selecting work can be lightened. When the presumed program is recorded automatically by the picture recording device, the viewer is able to view the program regardless of time when the program is broadcast, and a desired program can be selected from an increased number of programs. Since a program presumed to be a viewer's favorite program is recorded automatically at a high probability, the viewer will not fail in viewing the favorite program and in recording the favorite program.

BRIEF DESCRIPTIN OF THE DRAWINGS

FIG. 3 is a program database table to be used by the TV program selection support systems in the first to the fourth embodiments according to the present invention;

FIG. 4 is a view monitoring table to be used by the TV program selection support systems in the first to the fourth embodiments according to the present invention;

FIG. 5 is a view history record table to be used by the TV program selection support systems in the first to the fourth embodiments according to the present invention;

FIG. 6 is a view element analysis table to be used by the TV program selection support systems in the first to the fourth embodiments according to the present invention;

FIG. 7 is a preference measure conversion table to be used by the TV program selection support systems in the first to the fourth embodiments according to the present invention;

FIG. 8 is a program presetting data to be used by the TV program selection support systems in the first to the fourth embodiments according to the present invention;

FIG. 18 is table of data on a program recording schedule to be carried out by the TV program selection support systems in the first and the second embodiments according to the present invention;

DESCRIPTION OF THE PREFERRED EMBODIEMNTS

Figure 1:
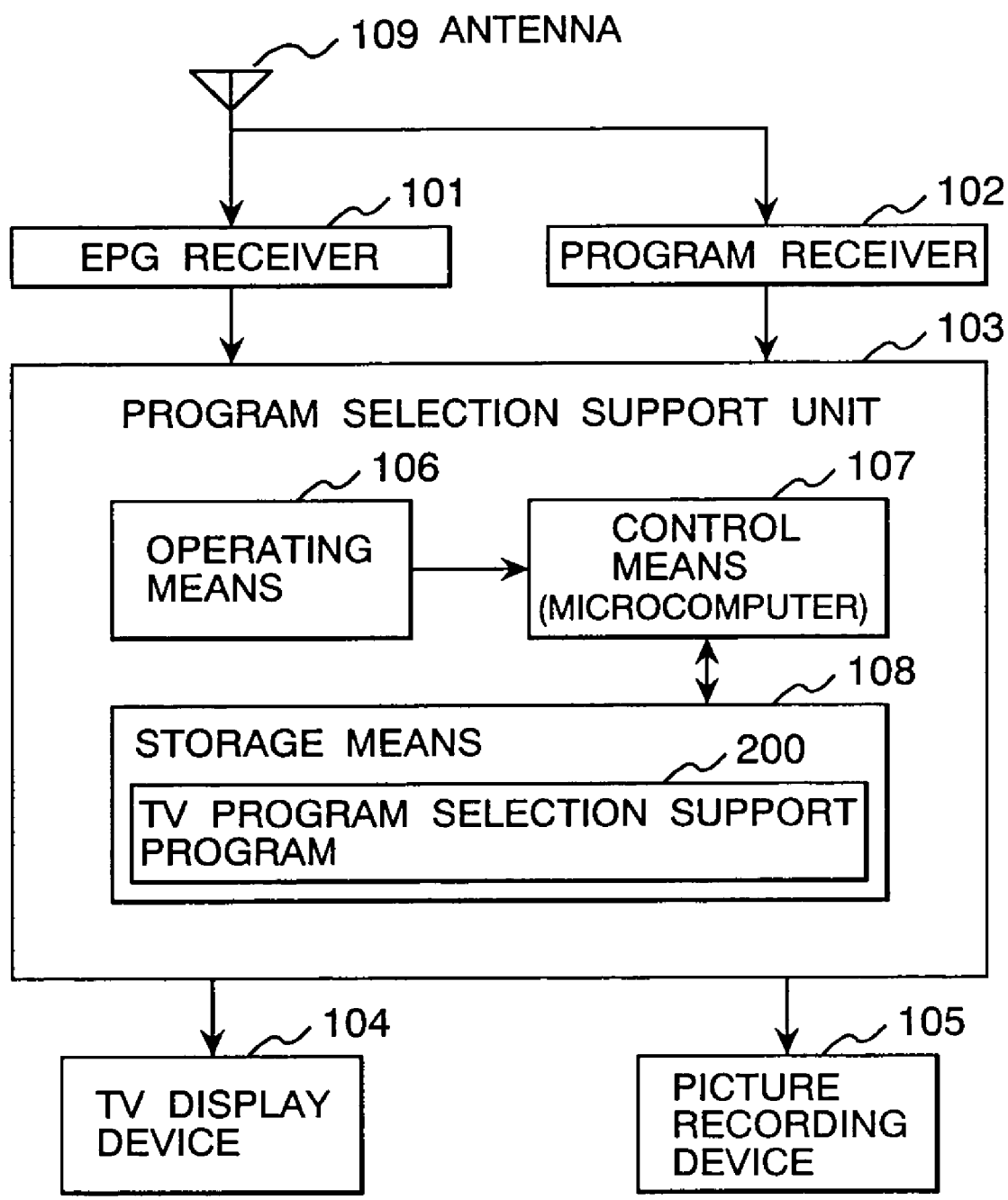
FIG. 1 is a block diagram of a TV program selection support system in a first embodiment according to the present invention.

FIG. 1 is a block diagram of a TV program selection support system in a first embodiment according to the present invention applied to a video recording device. An antenna 109 receives a broadcast TV signal. An EPG receiver (electronic program guide receiver) 101 receives an EPG (electronic program guide), and a program receiver 102 receives a program of a tuned channel. The EPG and the program are given to a TV program selection support system 103. The TV program selection support system 103 executes a TV program selection support program 200 to record a program which is considered to be a viewer's favorite program by a picture recording device 105. A viewer views the recorded program displayed by a TV display device 104.

The TV program selection support program 200 is stored in a storage means 108 included in the TV program selection support system 103. When executing the TV program selection support program 200, the TV program selection support program 200 is copied onto a memory included in a control means 107. User operated information, such as program selection by use of a remote controller is inputted to the control means 107 through the operating means 106. The TV program selection support program 200 may be stored in a memory means from which a computer is able to read data, such as a floppy disk or an optical disk, and the TV program selection support program 200 may be read for execution from the memory means.

The TV program selection support system 103 may be incorporated into the TV display device 104, such as a TV set, or a picture recording device 105, such as a VTR.

Figure 2:
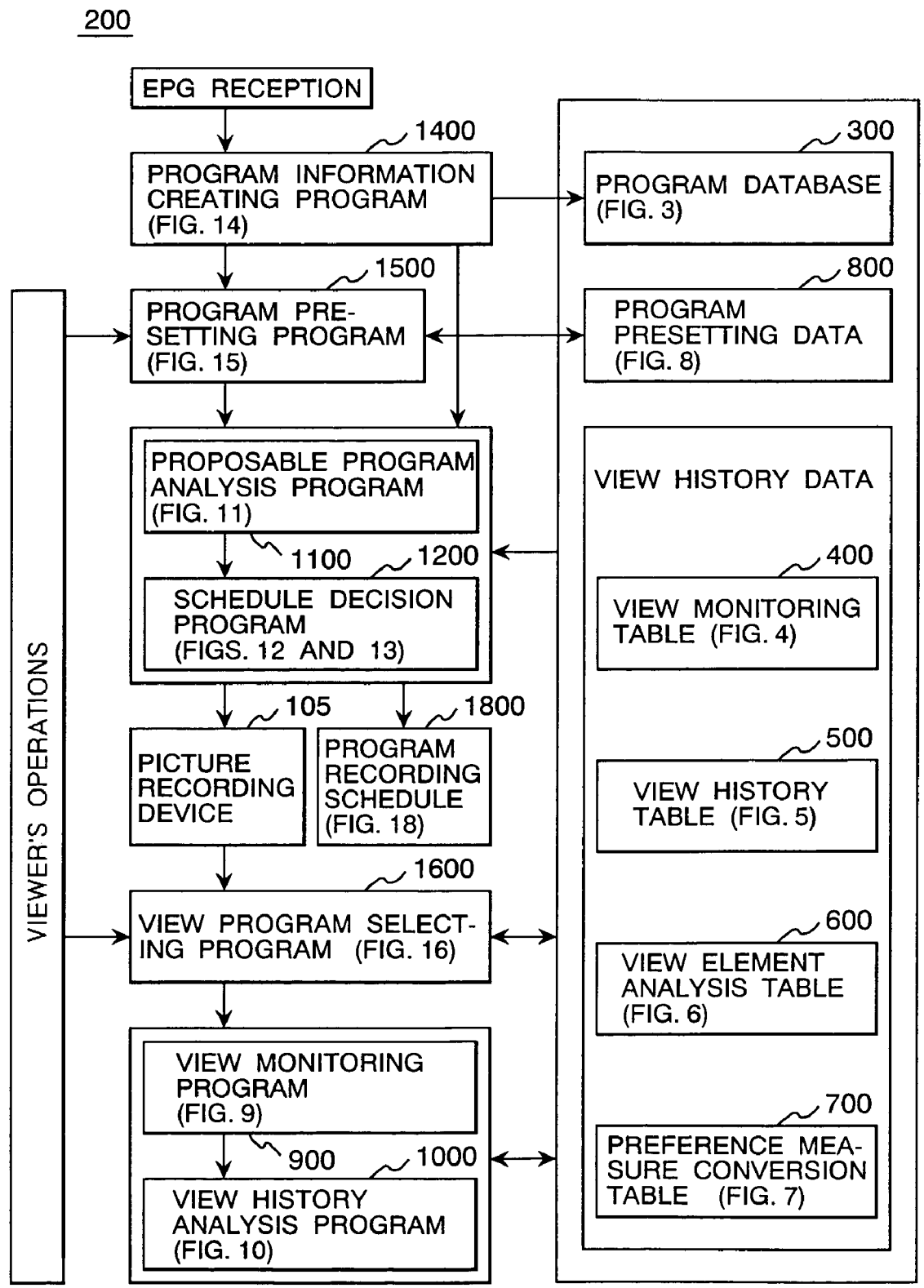
FIG. 2 is a flow chart of a TV program selection support program to be carried out by TV program selection support systems in first to fourth embodiments according to the present invention.

FIG. 2 shows a flow chart of the TV program selection support program 200 for supporting a program selecting operation to be carried out by the viewer, and data to be used when executing the TV program selection support program 200. A program information creating program 1400 is started upon the reception of the EPG to create a program database 300 for each program on the basis of the EPG. A program presetting program 1500 is executed when the viewer desires to preset a program for recording. The program presetting program 1500 is not necessarily essential to the TV program selection support program 200. The TV program selection support program 200 goes through the program presetting program 1500 to a proposable program analysis program 1100 or goes directly to the proposable program analysis program 1100. When the viewer carries out a program presetting operation, the program presetting program 1500 creates program presetting data 800.

The proposable program analysis program 1100 creates a preference measure conversion table 700 on the basis of a view element analysis table 600 and the program database 300 and calculates a viewer's preference measure for each program to be broadcast. A schedule decision program 1200 creates a program recording schedule 1800 on the basis of the preference measure conversion table 700, taking into consideration program presetting made by the viewer.

The picture recording device 105 records programs automatically according to the program recording schedule 1800 thus created. The viewer carries out a view program selecting operation according to a view program selecting program 1600, using a program selection picture 1700 shown in FIG. 17 to select the desired program out of recorded programs and to view the desired program. While the viewer is viewing the program, a view monitoring program 900 monitors the program by using a view monitoring table 400. Upon the termination of viewing the program, the view monitoring program 900 records results of monitoring on a view history table 500 and the view element analysis table 600. The foregoing is an outline of functions of the TV program selection support program 200. The component programs and the formation of the data will be described hereinafter.

FIG. 3 shows the formation of the program database 300. The program database 300 stores program information in the sections 301 to 313. The program database 300 has a channel section 301, a program name section 302, a broadcasting date and time section 303, a time period section 304, a genre section 305, a purchase price section 306, a sound and language section 307, a broadcasting mode section 308, a comment section 309, a featuring person section 310, a keyword section 311, a serial number section 312 and a preference measure section 313. Preference measures representing degrees of viewer's preference and calculated by using the preference measure conversion table 700 are stored in the preference measure section 313. At present, EPG is not standardized, and different broadcasting stations transmit EPGs respectively comprising different program information pieces. The different EPGs are converted by the program information creating program 1400 into the program database 300, thereby being unified for use.

FIG. 4 shows the formation of the view monitoring table 400 for recording the history of a program being viewed. The view monitoring table 400 specifies program name 402, program completion time 403 and view time period 404 for each program. A program being presently viewed is indicated by a program pointer 401. If the act of viewing the program is interrupted and the same is resumed again, the view time period 404 is equal to the sum of view time periods. When a recorded program is viewed, a term, "VIDEO" is recorded instead of time as the program completion time 403.

FIG. 5 shows the formation of the view history table 500 showing view scores and view measures indicating an extent to which each program was viewed. The view history table 500 includes program name 501, view scores 502 and 503 for the serial numbers of series programs, and program view measure 504 obtained by dividing the sum of view scores by the number of serials of the series programs, i.e., mean view score. The view score of a program which is not a series program is entered in a section for the first view score 502. The view score is obtained by dividing a view time period by a program time period. Therefore, the view score is 1.0 when a program is viewed completely. The program view measure 504 is calculated and updated every time the view score 502 or 503 is entered. If a recorded program is viewed repeatedly, the view score for the program is greater than 1.0.

FIG. 6 shows the formation of a view element analysis table 600 to be used for analyzing viewer's preference. The view element analysis table 600 has a view element column 601, a total view score column 602, a number-of-program column 603 and specific view score (=(total view score)/(number of programs)) column 604. The view element column 601 has sections for a genre section 605, a time section 606, a time period section 607, a day section 608, a person's name section 609, a sound and language section 610, a serial number section 611, a keyword section 612, a price section 613 and a channel section 614. These components corresponds substantially to those of the program database 300. The sections 605 to 614 of the view element column 601 are divided into subsections. Reference is made to the program database 300 every time the viewer views a program to determine values for the sections 605 to 614 of the view element column 601, and a view score shown in the view history table 500 is added to the value of the corresponding item of the total view score column 602. Since the total view scores of view elements of programs which are often viewed are large, it is highly possible that the view elements having large total view scores are factors for selecting programs. The bias of the total view score dependent on the number of supplied programs can be corrected by using specific view scores in the specific view score column 604 obtained by dividing view scores in the total view score 602 by the numbers of corresponding programs in the number-of-program column 603. Suppose that the viewer never miss programs included in a genre rarely selected for broadcasting. Then, the total view score of a program in such a genre is small. However, the specific view score of the program is large.

FIG. 7 shows the formation of a preference measure conversion table 700 for estimating the degrees of viewer's preference for programs to be broadcast obtained from the EPG. The preference measure conversion table 700 has a view element column 701, and a total view score or specific view score (=(total view score)/(number of programs)) column 702. The view element column 701 has a weighted program view measure (=(program view measure)((weight))) section 703, a genre section 704, a time section 705, a time period section 706, a day section 707, a person's name section 708, a sound and language section 709, a serial number section 710, a keyword hit point section 711, a price section 712, a channel section 713 and a grand total view score section 714. A weighted program view measure in the weighted program view measure section 703 is obtained by multiplying a program view measure in the program view measure column 504 of the corresponding program shown in the view history table 500 by a value not smaller than 1.

The view elements in sections 704 to 713 shown in FIG. 7 correspond, respectively, to the view elements in sections 605 to 614 shown in the view element analysis table 600. When calculating the degree of viewer's preference for a program, reference is made to a total view point or a specific view score on the basis of correspondence between the program database 300 and the view elements of the view element analysis table 600, values to which reference is made are entered in the preference measure conversion table 700, and a grand total view score in the grand total view score section 714 is calculated. It is considered that the viewer's preference for the program is high when the grand total view score in the grand total view score section 714 of the program is large.

FIG. 8 shows the formation of a program presetting data 800 to be used by the viewer when specifying a program to be recorded. The program presetting data 800 has a presetting element section 801, a program section 803, a program name section 804, a keyword section 805 and a performer section 806. Lists of presetting elements, programs, program names, keywords and performers are arranged in a list column 802. The list for the program section 803 includes pointers indicating programs included in the program database 300, and permits giving a recording instruction just once. The list for the program name section 804 includes program names and is used when it is desired to record a series program or a program the time of broadcasting of which is unknown and which is desired to be recorded when broadcast, when the program name included in the list of the program presetting data 800 is found in the program name section 302 of the program database 300 irrespective of broadcasting date and time and channel. The list for the keyword section 805 includes keywords in which the viewer is interested. When a keyword included in this list is found in the column for keyword of the program database 300, an instruction for recording the corresponding program is given. The list for the keyword section 805 includes keywords in which the viewer is interested. When a keyword included in the list is found in the keyword section 311 of the program database 300, an instruction for recording the corresponding program is given. The list for the person's name section 806 includes person's names, such as names of performers and producers, attracting viewer's interest. When a person's name included in the list is found in a column for person's name of the program database 300, an instruction for recording the corresponding program is given. The program name section 804, the keyword section 805 and the performer section 806 are specified by a method which displays the phonetic alphabet and make the viewer select letters, a method which displays the EPG and makes the viewer select letters included in the EPG or a method which displays probable program names, keywords and performers and make the viewer select desired ones.

Figure 9:
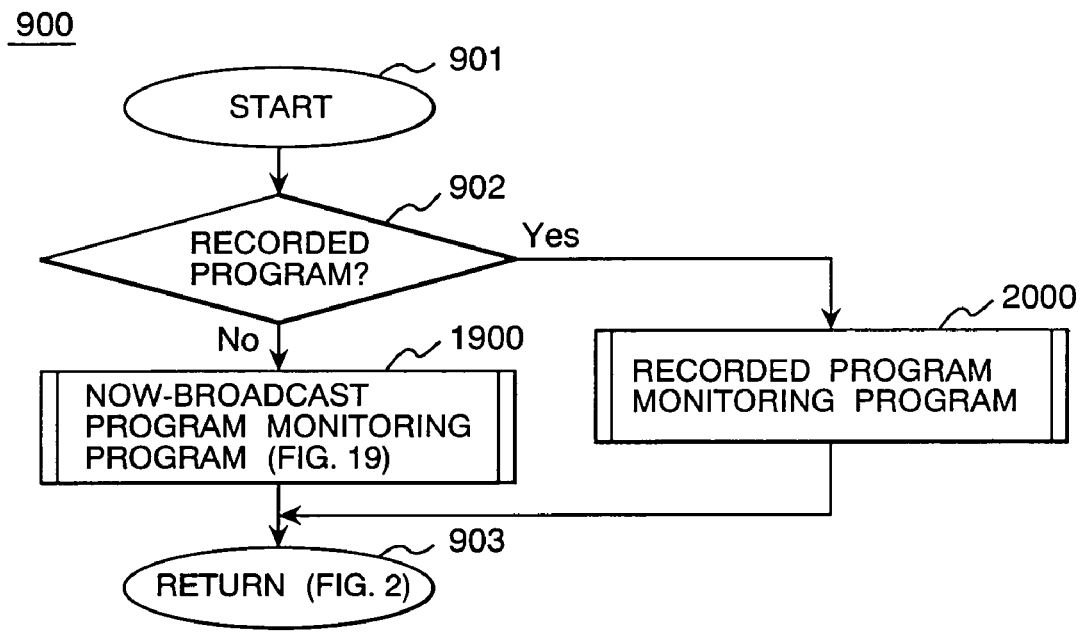
FIG. 9 is a flow chart of a view monitoring program to be carried out by the TV program selection support systems in the first to the fourth embodiments according to the present invention.

FIG. 9 is a flow chart of a view monitoring program 900 for recording a viewer's view history specifying programs selected by the viewer in the past. The view monitoring program 900 is started in step 901 when the viewer starts viewing a program. A query is made in step 902 to see whether the program is a recorded program or a now-broadcast program. A recorded program monitoring program 2000 is started if the program is a recorded program. A now-broadcast program monitoring program 1900 is started when the program is a now-broadcast program. The view monitoring program 900 is ended in step 903 upon the completion of the program 2000 or the program 1900.

Figure 20:
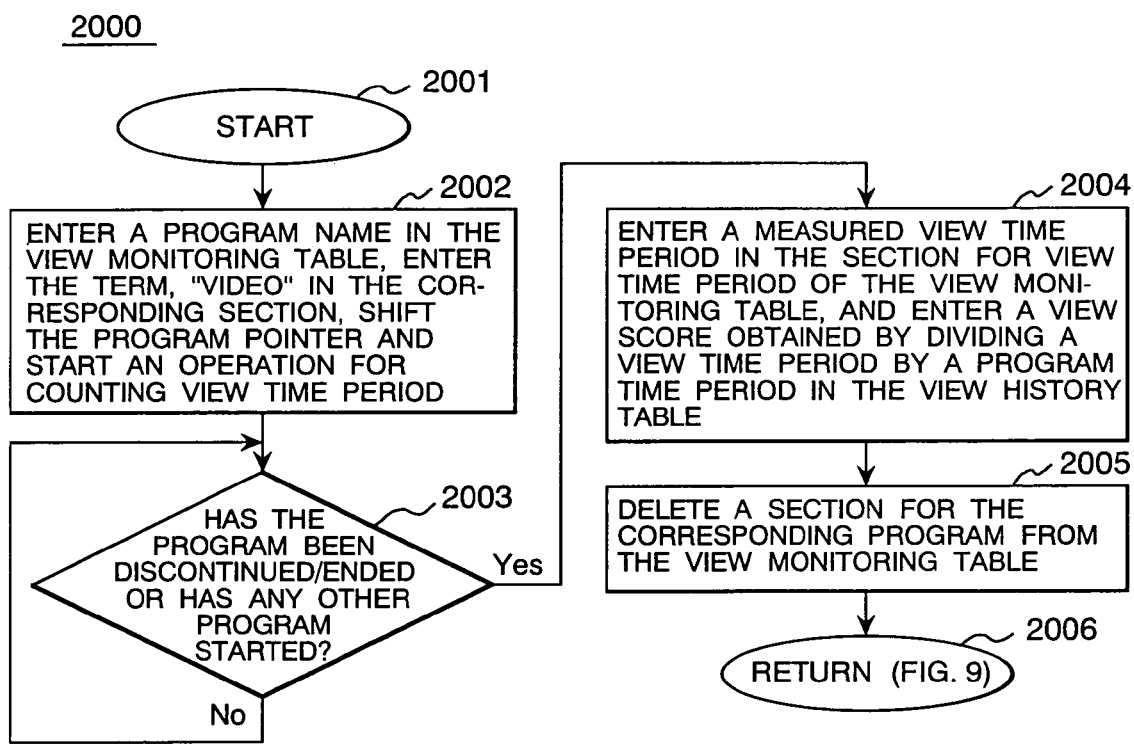
FIG. 20 is a flow chart of a recorded program view monitoring program to be carried out by the TV program selection support systems in the first and the second embodiments according to the present invention.

FIG. 20 is a flow chart of the recorded program view monitoring program 2000. The program 2000 is started in step 2001. In step 2002, a program name is entered in the view monitoring table 400, the term, "VIDEO" is entered in the corresponding section, a program pointer 401 is shifted and an operation for counting view time period is started in step 2002. When the viewing of the program is interrupted or ended in step 2003, the program goes to step 2004.

In step 2004, a measured view time period is entered in the section for view time period of the view monitoring table 400, and a view score obtained by dividing a view time period by a program time period is entered in the view history table 500. A section for the corresponding program is deleted from the view monitoring table 400 in step 2005 and the program is ended in step 2006.

Figure 19:
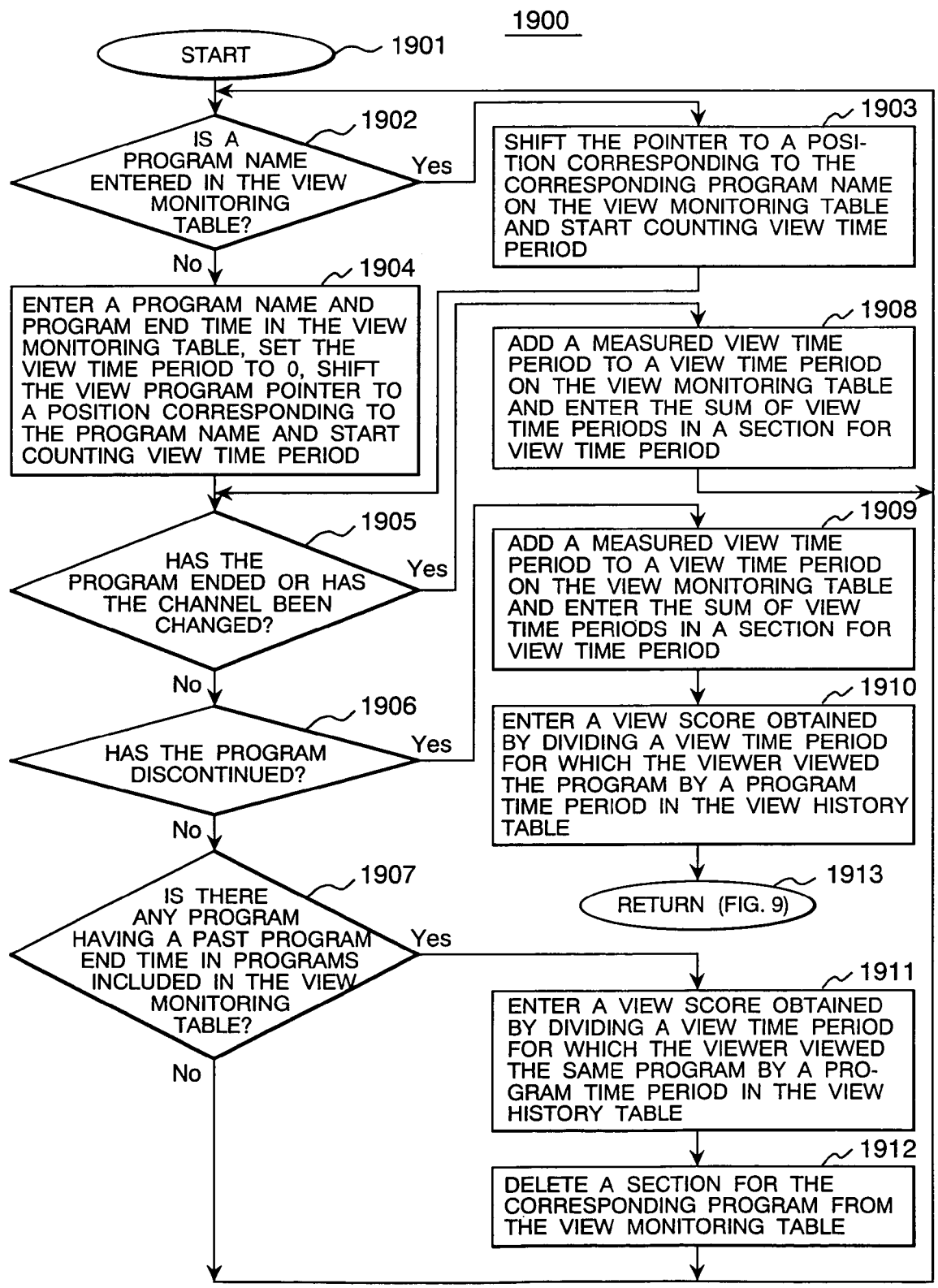
FIG. 19 is a flow chart of a view monitoring program to be carried out by the TV program selection support systems in the first to the fourth embodiments according to the present invention to monitor program during broadcasting.

FIG. 19 is a flow chart of the now-broadcast program monitoring program 1900. The now-broadcast program monitoring program 1900 is activated by the view monitoring program 900. After starting the program at step 1901, a query is made in step 1902 to see if a program name is entered in the view monitoring table 400. If the response in step 1902 is affirmative, the pointer 401 is shifted to a position corresponding to the corresponding program name and an operation for counting view time period is started in step 1903, and the program 1900 goes to step 1905. If the response in step 1902 is negative, a program name and program end time are entered in the view monitoring table 400, the view time period is set to 0, the view program pointer 401 is shifted to a position corresponding to the program name and an operation for counting view time period is started in step 1904, and then the program 1900 goes to step 1905. A query is made in step 1905 to see if the program has ended or if the channel has been changed. If the response in step 1905 is affirmative, a measured view time period is added to a view time period on the view monitoring table 400 and the sum of view time periods is entered in a section for view time period in step 1908 and the program returns to step 1902. If the response in step 1905 is negative, a query is made in step 1906 to see if the program has been discontinued. If the response in step 1906 is affirmative, a measured view time period is added to a view time period in the view monitoring table 400 in step 1909, a view score obtained by dividing a view time period for which the viewer viewed the program by a program time period is entered in the view history table 500 in step 1910 and the program is ended in step 1913. If the response in step 1906 is negative, a query is made in step 1907 to see if there is any program having a past program end time in programs included in the view monitoring table 400, and if the response in step 1907 is affirmative, a view score obtained by dividing a view time period for which the viewer viewed the same program by a program time period is entered in the view history table 500 in step 1911, a section for the corresponding program is deleted in step 1912, and the program returns to step 1902. If the response in step 1907 is negative, the program returns directly from step 1907 to step 1902.

As mentioned above in connection with FIGS. 9, 19 and 20, the TV program selection support system monitors how long the viewer viewed a program and creates the view history table 500. When the view history table 500 is created, the view history analysis program 1000 is activated, reference is made to the program database 300 and a viewer's viewing tendency is analyzed to find a viewer's preference.

Figure 10:
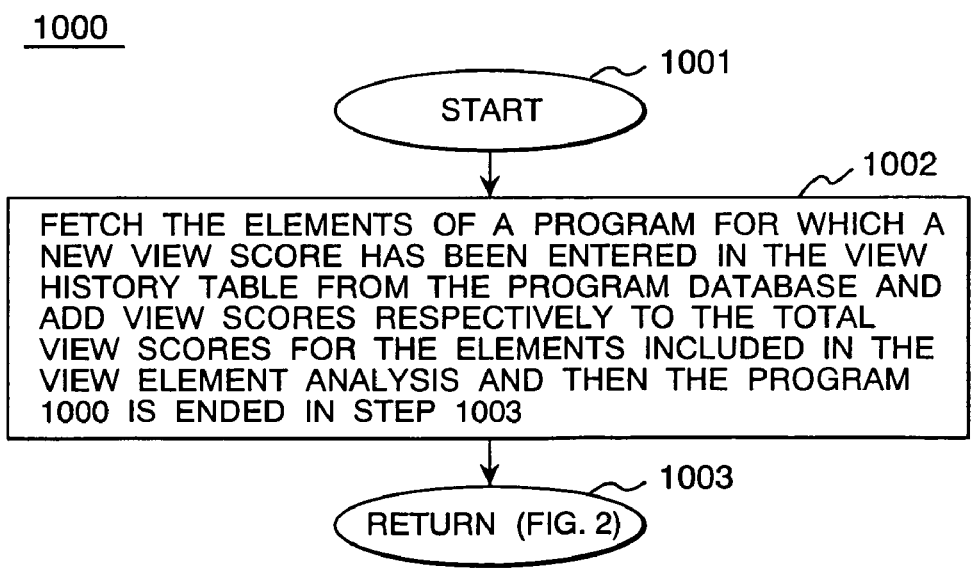
FIG. 10 is a flow chart of a view history analysis program to be carried out by the TV program selection support systems in the first to the fourth embodiments according to the present invention.

FIG. 10 is a flow chart of the view history analysis program 1000. The view history analysis program 1000 is activated in step 1001. The elements of a program for which a new view score has been entered in the view history table 500 are fetched from the program database 300 and view scores are added respectively to the total view scores for the elements included in the view element analysis table 600 in step 1002, and then the program 1000 is ended in step 1003. Suppose that a first view score of 0.5 is entered in a section for a program name "YY Information Station". Since two genres, i.e., "News/domestic" and "Variety/gourmet", are registered in the genre section 305 for the program "YY Information Station", a view score 0.5 is added to values in total view score sections for a subgenre "Domestic" of a genre "News", and a subgenre "Gourmet" of a genre "Variety" of the view element analysis table 600. The same procedures are carried out for the rest of the elements. Viewer's view elements can be analyzed by this series of procedures.

Figure 11:
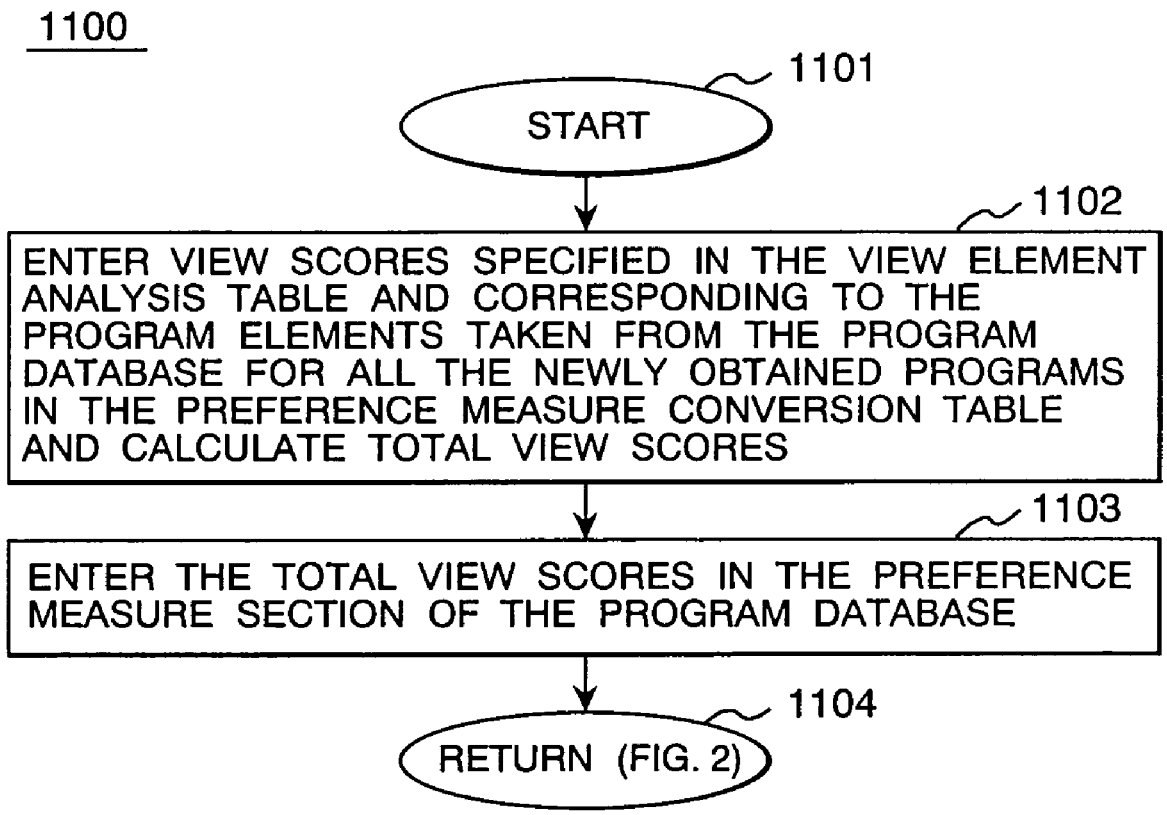
FIG. 11 is a proposable program analysis program to be carried out by the TV program selection support systems in the first to the fourth embodiments according to the present invention.

FIG. 11 shows the proposable program analysis program 1100 for presuming the degree of preference of the viewer for programs to be broadcast every time the EPG is updated or periodically at predetermined time intervals. The proposable program analysis program 1100 is activated in step 1101. Then, in step 1102, view scores specified in the view element analysis table 600 and corresponding to the program elements taken from the program database 300 for all the newly obtained programs are entered in the preference measure conversion table 700 and total view scores are calculated (1102). The total view scores are entered in the preference measure section 313 of the program database 300 in step 1103, and ends (1104). For example, in the program database 300 shown in FIG. 3, the broadcasting day of the "YY Information Station" is "Sunday". Therefore, a total view score in a section for "Sunday" of the day 608 of the view element analysis table 600 is "24.4" and the specific view score is "0.045". Therefore, "24.4" or "0.045" is entered in a section for the day 707 of the preference measure conversion table 700 shown in FIG. 7 for "YY Information Station".

The view genre/subgenre includes "News/domestic" and "Variety/gourmet". Reference is made to sections for "News/domestic" and "Variety/gourmet" of the genre 605 of the view element analysis table 600, and a greater value is employed, and the greater value is entered in a section for the preference measure conversion table 700. Similar processes are carried out for the rest of the elements, the total is calculated and calculated total is entered in the preference measure section 313 of the program database 300. Thus, preference measures for the programs. It is presumed that the viewer's preference is higher for the programs having greater preference measures.

Figure 12:
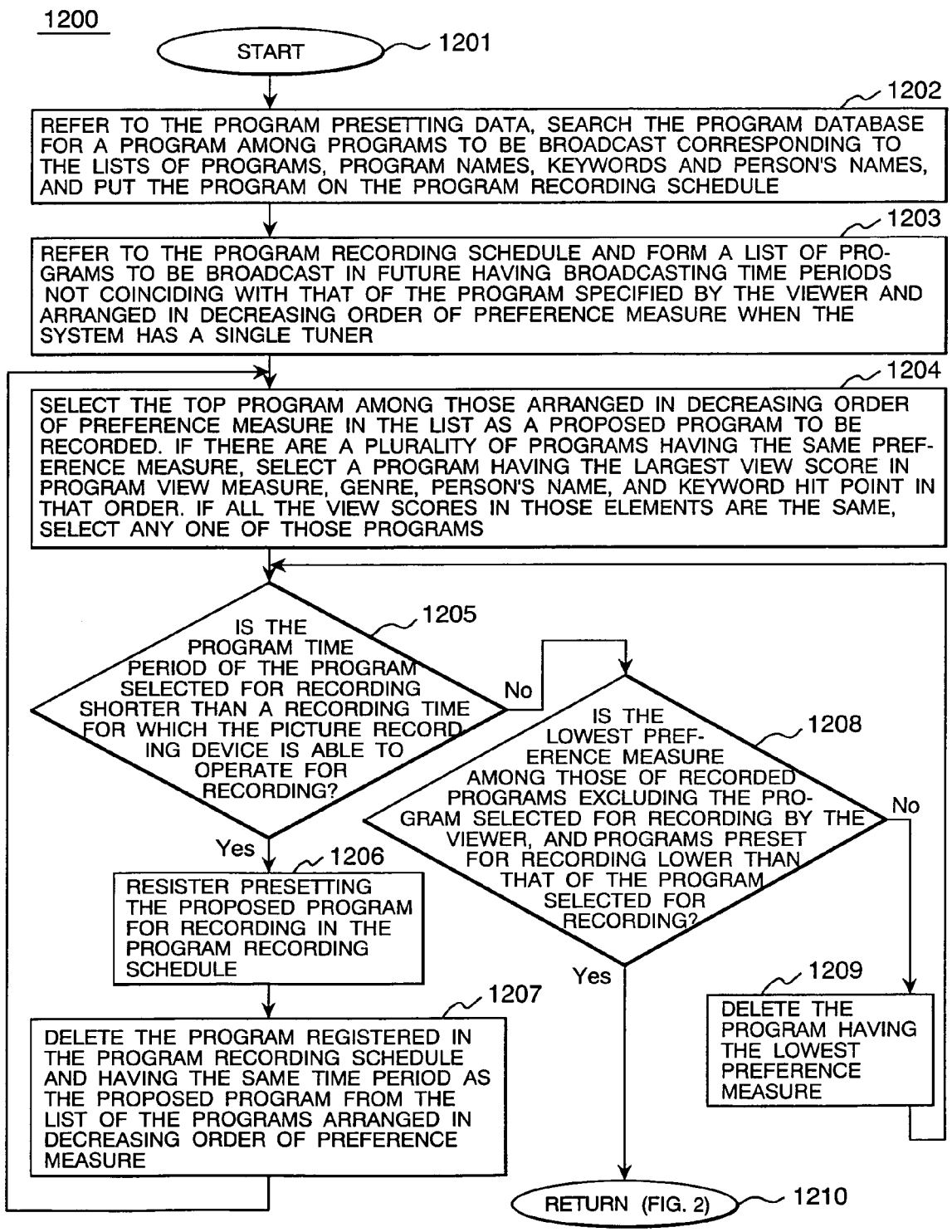
FIG. 12 is a flow chart of a schedule decision program to be carried out by the TV program selection support systems in the first to the third embodiments according to the present invention.

FIG. 12 is a flow chart of a schedule decision program 1200 for determining programs to be recorded on the basis of preference measures written to the preference measure section 313. The schedule decision program 1200 is stared after the completion of the proposable program analysis program 1100 and hence the schedule decision program 1200 is activated every time the EPG is updated or periodically at predetermined time intervals. When the schedule decision program 1200 is stared in step 1201, reference is made to the program presetting data 800, the program database 300 is searched for a program corresponding to the lists of programs, program names, keywords and person's and the program is entered in the program recording schedule 1800 in step 1202. As shown in FIG. 18, the program recording schedule 1800 has a broadcasting date column 1801, a channel/channel name column 1802, a starting time column 1803, an ending time column 1804, a program name column 1805 and a presetting method column 1806. Entered in a section of the presetting method column 1806 is "UP" if a program is specified by the viewer, "UPN" if a program name is specified by the viewer, "UK" if a keyword is specified by the viewer, "UN" if a person's name is specified by the viewer, or "A(System confidence measure)" if automatic recording by the TV program selection support system is selected. System confidence measure is determined by converting the preference measure. If the program receiver is provided with a single tuner, a plurality of programs cannot simultaneously be recorded and a program specified for recording by the viewer is recorded preferentially. Therefore, in step 1203, reference is made to the program recording schedule 1800 and a list of programs to be broadcast in future having broadcasting time periods not coinciding with that of the program specified by the viewer is created. In this list, the programs are arranged in decreasing order of preference measure.

If the program receiver 102 is provided with a plurality of tuners and the picture recording device 105 is capable of simultaneously recording a plurality of programs, a process to omit programs to be broadcast in a time period coinciding with that in which the program specified by the viewer is to be broadcast can be omitted in step 1203. The top program among those arranged in order of preference measure in the list is selected as a proposed program to be recorded in step 1204. If there are a plurality of programs having the same preference measure, a program having the largest view score in program view measure, genre, person's name, and keyword hit point in that order is selected. If all the view scores in those elements are the same, any one of those programs may be selected.

A query is made in step 1205 to see if the program time period of the program selected for recording is shorter than a recording time for which the picture recording device 105 is able to operate for recording. If the response in step 1205 is affirmative, presetting the proposed program for recording is registered in the program recording schedule 1800 in step 1206 and the program goes to step 1207. In step 1207, the program registered in the program recording schedule 1800 is deleted from the list of the programs arranged in order of preference measure. If the program receiver 102 is provided with a single tuner or the picture recording device 105 is capable of recording a single program, programs to be broadcast in the same time period as the program registered for recording are deleted from the list of programs arranged in order of preference measure, and then the program returns to step 1204. If the response in step 1205 is negative, i.e., if the program time period of the program selected for recording is longer than the recording time for which the picture recording device 105 is able to operate for recording, the preference measure of a program recorded by the TV program selection support system or a program to be recorded by the TV program selection support system is compared with that of the program selected for recording in step 1208. If the lowest preference measure among those of the program recorded by the TV program selection support system or programs to be recorded by the TV program selection support system is lower than the preference measure of the program selected for recording, the program having the lowest preference measure is deleted in step 1209 and the program returns to step 1205.

If the response in step 1208 is affirmative, the program presetting procedure is discontinued and the program is ended in step 1210. Thus, a program presumed to have a high preference measure can be recorded. A process for successively deleting programs which have been viewed before among the recorded programs, and a process for recalculating the preference measures to correct the previously calculated preference measures because viewer's preference for the same program varies with time are necessary to increase the number of programs to be recorded. When deleting an automatically recorded program, the TV program selection support system may inquire of the viewer if the program may be deleted after the same has been viewed, the preference measure of the program may be reduced after the same has been viewed or the program may automatically be deleted after the program has been left not viewed for a predetermined period.

Figure 13:
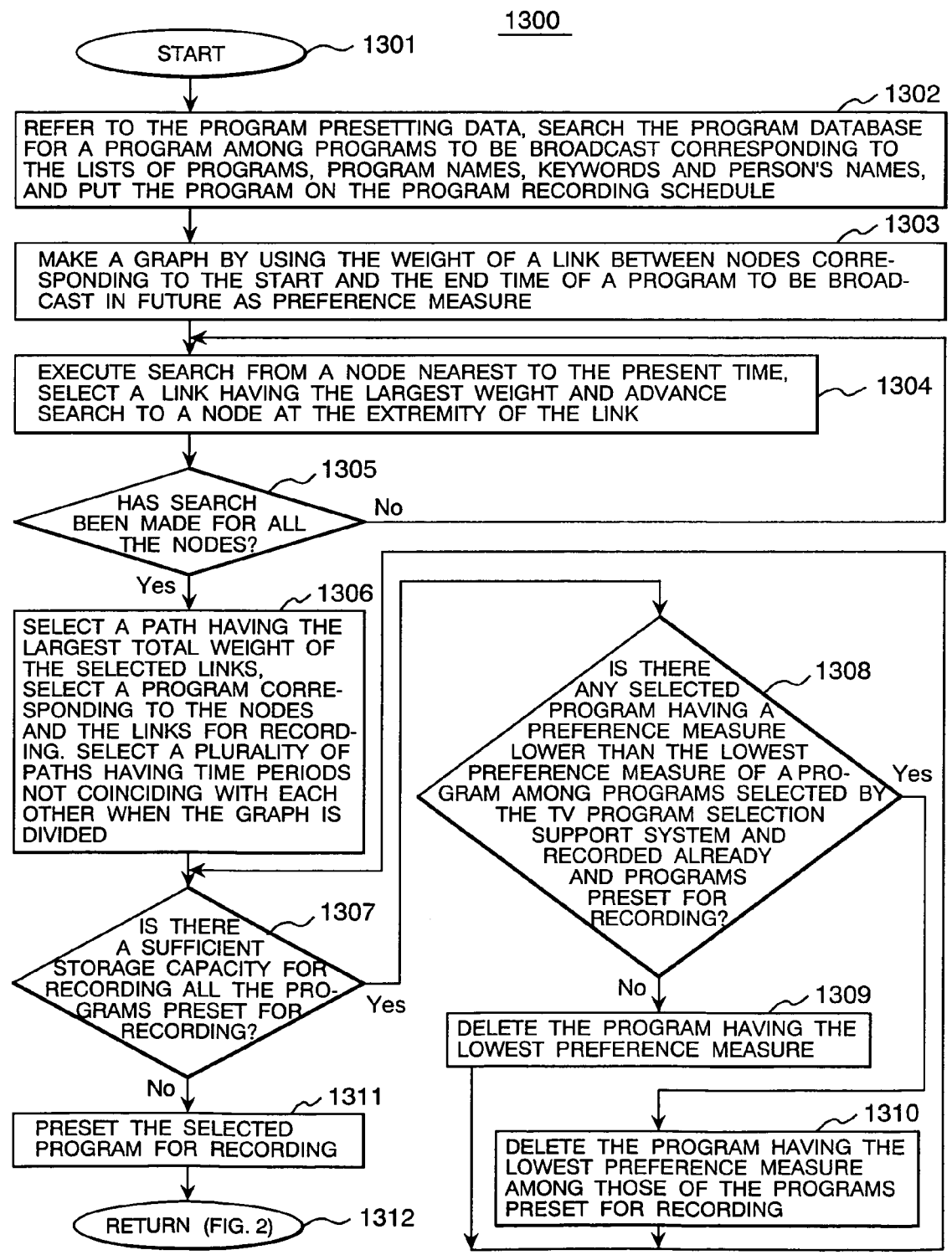
FIG. 13 is flow chart of another schedule decision program to be carried out by the TV program selection support systems in the first to the third embodiments according to the present invention.

FIG. 13 is a flow chart of a schedule decision program 1300 in a modification of the schedule decision program 1200 shown in FIG. 12. The schedule decision program 1300 is greatly different from the schedule decision program 1200 in that a recording schedule is designed so that recording time may not be interrupted if possible. When a recording schedule is created by the schedule decision program 1300, program selection meeting the creation of a schedule permitting continuously viewing television for half a day can be supported in addition to automatic recording.

When started (1301), the schedule decision program 1300, similarly to the schedule decision program 1200, makes reference to the program presetting data 800, retrieves a program corresponding to the program, the program name, the keyword and the list of person's name from the program database 300 and enters the same in the program recording schedule 1800 in step 1302 to enable the viewer to preset a program for recording. In step 1303, a graph is made by using the weight of a link between nodes corresponding to the start and the end time of a program to be broadcast in future as preference measure. The schedule decision program 1300, similarly to the schedule decision program 1200, settles the selection of nodes and a link corresponding to the program preset for recording and deletes nodes and links corresponding to other programs having a broadcasting time period coinciding with that of the program preset for recording in step 1303 to give a recording priority to the program preset by the viewer.

After the graph has been made, a search for an optimum path in the graph is started. The Dijkstra's K-th best method is used for the search. First, a search is started from a node nearest to the present time, a link having the largest weight is selected and then the search advances to a node at the extremity of the link in step 1304. This search cycle is repeated. After the completion of searches for all the nodes (step 1305), a path having the largest sum of the weights of the selected links is selected, and selects a program corresponding to the nodes and the link as a program preset for recording. It is possible that the graph is divided. If the graph is divided, the path is selected so that the times of the divisions of the graph may not coincide with each other in step 1306. In step 1307, a query is made to see if there is a sufficient storage capacity for recording all the programs preset for recording. If the storage capacity is sufficiently large, a recording schedule for recording the programs selected for recording is entered in the recording schedule 1800 in step 1311 and the program 1300 is ended in step 1312. If it is decided in step 1307 that the storage capacity is insufficient, a query is made in step 1308 to see if there is any selected program having a preference measure lower than the lowest preference measure of a program among programs selected by the TV program selection support system and recorded already and programs preset for recording. If the response in step 1308 is affirmative, the program having the lowest preference measure among those of the programs preset for recording is deleted in step 1310 and the program returns to step 1307. If the response in step 1308 is negative, the program having the lowest preference measure is deleted in step 1309 and the program returns to step 1307.

The TV program selection support system selects programs conforming to the viewer's preference and presets the selected programs for recording according to the schedule decision programs 1200 and 1300. Therefore, the viewer is relieved of troublesome operations for presetting programs for recording and is able to view favorite programs when the viewer feels like viewing the same. Since the TV program selection support system records automatically programs presumed to be viewer's favorite ones, it is highly probable that the viewer's favorite programs are recorded even if the viewer fails to preset the programs for recording. Since the TV program selection support system learns the view tendency of the viewer every time the viewer views a program, the preference measures of programs which were recorded but have not been viewed decreases at a high possibility, and those programs are deleted when the storage capacity is insufficient. Therefore, the viewer need not delete those unnecessary programs. Programs selected and preset for recording by the viewer and those to be automatically recorded by the TV program selection support system may be recorded in separate storage regions, respectively, and a plurality of tuners and a plurality of recording devices may be used to enhance handiness.

To the viewer, the automatic program recording is equivalent to the virtual increase of the number of broadcasting stations. When the TV program selection support system is noticed of changes in programs by the EPG, the recording schedule must be changed accordingly. When program change information is received, the program information creating program 1400 is started. The program change information is reflected on the program information database 300, and the proposable program analysis program 1100, and the schedule decision program 1200 or 1300 are activated to correct the program recording schedule. The program recording schedule decided by the schedule decision program 1200 or 1300 can be confirmed by the program presetting program 1500.

Figure 14:
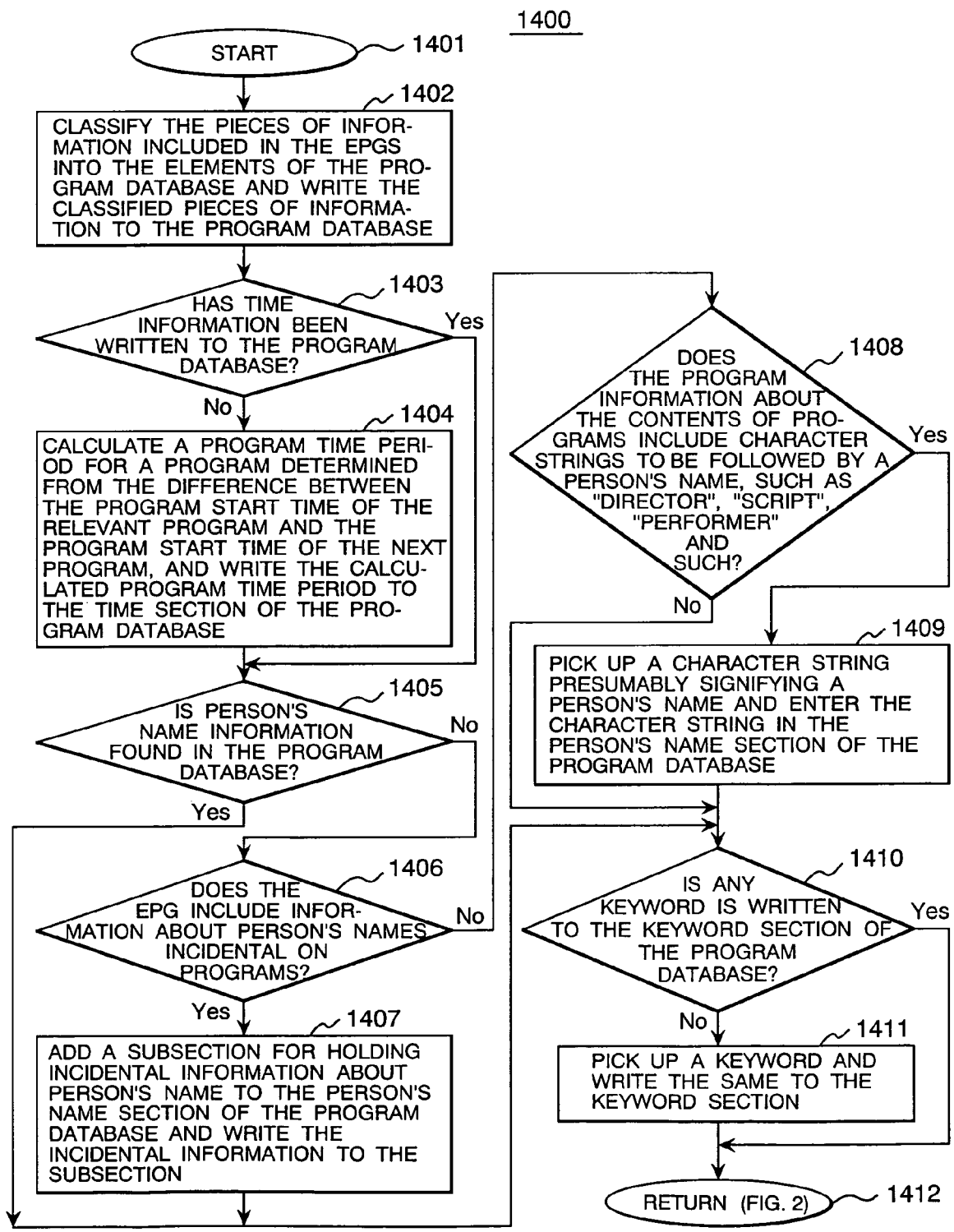
FIG. 14 is a program information creating program to be carried out by the TV program selection support systems in the first to the fourth embodiments according to the present invention.

FIG. 14 is a flow chart of the program information creating program 1400 for creating the program database 300 on the basis of the EPG. The program information creating program 1400 receives EPGs of different forms from different broadcasting stations by the EPG receiver and converts the received EPGs into EPGs of a standard data form. The program information creating program 1400 is activated every time an EPG is received or periodically at fixed time intervals, classifies the pieces of information included in the EPGs into the elements of the program database 300 and writes the classified pieces of information to the program database 300 in step 1402. All the program lists appearing in newspapers include, without exception, program names, program starting times, channel names and channels, and information about programs, including the contents of programs, performers, broadcasting modes, such as a stereophonic broadcasting mode and a broadcasting mode with subtitles, the serial numbers of series programs.

Therefore, information about program names, program starting times, channel names and channels can be obtained without fail from the EPG of any form, and the TV program selection support system needs a function to take out information which cannot be obtained from the EPG, such as keywords signifying person's names including the names of performers and producers, and the contents of programs according to the different forms of different EPGs.

The EPG includes information about the genres of programs. However, since there is no standard genre classification, the TV program selection support system needs a function to reclassify pieces of information about genres provided by different EPGs. The program information creating program 1400 is narrowed down to the standardization of time information person's name information and keyword information. Information about broadcasting modes, such as a stereophonic broadcasting mode and a broadcasting mode with subtitles, is provided in advance in some cases or is provided together with information about the contents of programs in other cases. When the information about broadcasting modes is included in the information about the contents of programs, the information about broadcasting modes can be obtained by a heuristic method which searches for particular character strings.

After starting the program at step 1401, and upon completion of step 1402, a query is made in step 1403 to see if time information has been written to the program database 300. The time information represents a program time period. In some cases, the EPG indicates only program start time for a program. In step 1404, a program time period for a program determined from the difference between the program start time of the relevant program and the program start time of the next program is calculated, and the calculated program time period is written to the time section 304 of the program database 300. A query is made in step 1405 to see if person's name information, such as performer's names, is found in the program database 300. If the response in step 1405 is affirmative, the program goes to step 1410. If the response in step 1405 is negative, a query is made in step 1406 to see if the EPG includes information about person's names such as producers and performers incidental on programs. If the response in step 1406 is affirmative, a subsection for holding incidental information about persons' name is added to the person's name section 310 of the program database 300 and the incidental information is written to the subsection in step 1407, and then the program goes to step 1410. If the response in step 1406 is negative, a query is made in step 1408 to see if the program information about the contents of programs includes character strings to be followed by a person's name, such as "director", "script", "performer" and such. If the response in step 1408 is affirmative, a character string presumably signifying a person's name is picked up and enters the character string in the person's name section 310 of the program database 300 in step 1409, and then the program goes to step 1410.

If the response in step 1408 is negative, the program goes to step 1410. In step 1410, a query is made to see if any keyword is written to the keyword section 311 of the program database 300. If the response in step 1410 is negative, a keyword is picked up and is written to the keyword section 311 in step 1411, and then the program is ended in step 1412. Thus, program information can be obtained from EPGs of different forms by carrying out the program information creating program 1400.

Figure 15:
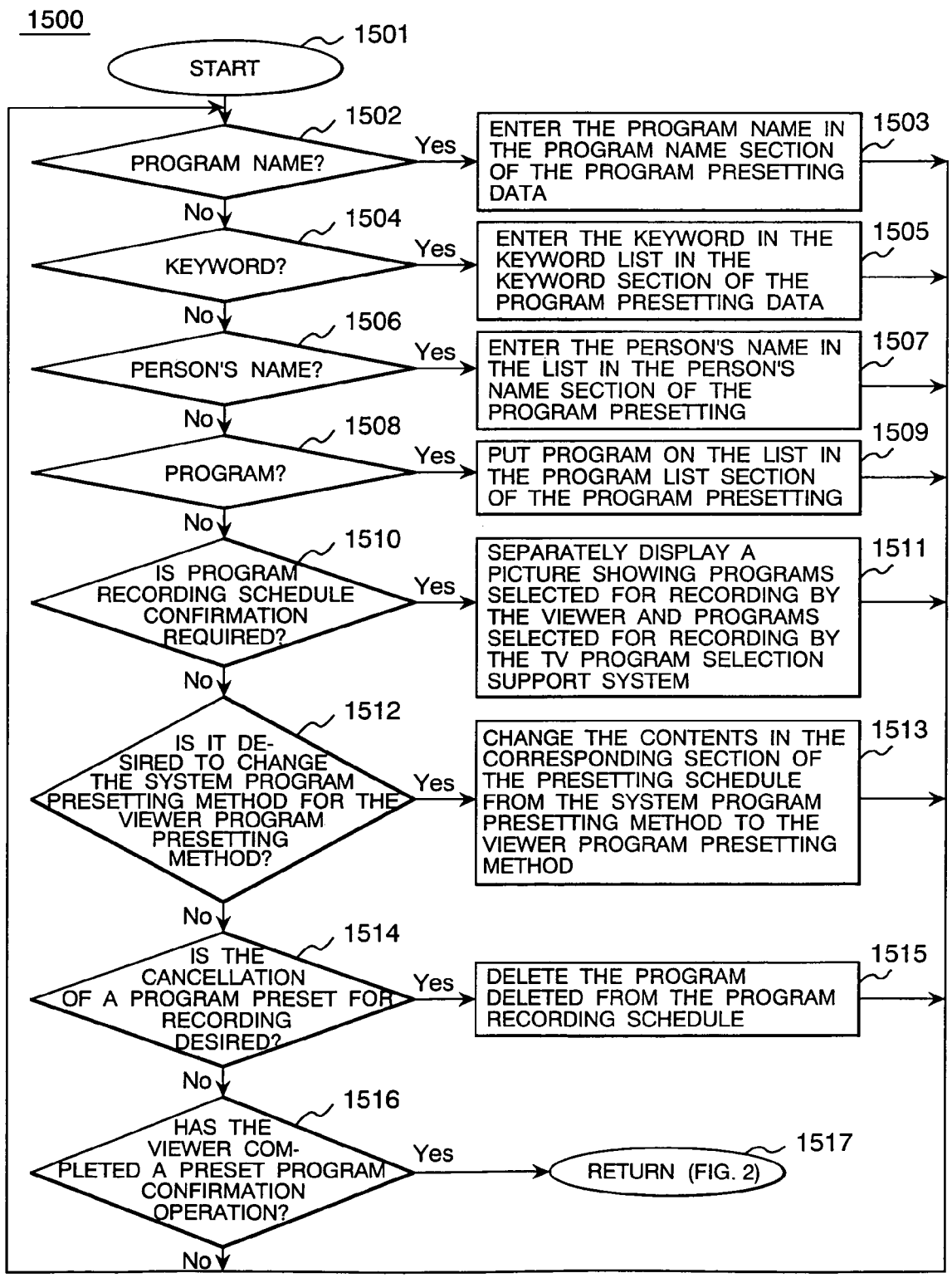
FIG. 15 is a program presetting program to be carried out by the TV program selection support systems in the first and the second embodiments according to the present invention.

FIG. 15 is a flow chart of the program presetting program 1500 for the viewer to preset a program for recording. The program presetting program 1500 is started in step 1501 by a viewer's starting operation. Since a program can be preset for recording by specifying a program name, a keyword, a person's name or a program, a query is made in step 1502 to see if a program name is specified, a query is made in step 1504 to see if a keyword is specified, a query is made in step 1506 to see if a person's name is specified and a query is made in step 1508 to see if a program is specified.

If the response in step 1502 is affirmative, the program name is entered additionally in the program name section 804 of the program presetting data 800 in step 1503. If the response in step 1504 is affirmative, the keyword is entered additionally in the keyword list in the keyword section 805 of the program presetting data 800 in step 1505. If the response in step 1506 is affirmative, the person's name is entered additionally in the list in the person's name section 806 of the program presetting data 800 in step 1507. If the response in step 1508 is affirmative, the program is put additionally on the list in the program list section 803 of the program presetting data 800 in step 1509. Then, the program returns to step 1502. When the schedule is changed, programs automatically preset for recording by the TV program selection support system are deleted automatically or are not recorded if there is not time available for recording. If the viewer desires to record and view a program preset for recording by the TV program selection support system without fail, it is safe to preset the program for recording by the viewer. The program presetting program 1500 enables changing a system program presetting method for a viewer program presetting method.

A query is made in step 1510 to see if program recording schedule confirmation is required. If the response in step 1510 is affirmative, a picture showing programs selected for recording by the viewer, programs selected for recording by the TV program selection support system, and instruction including an instruction for program specification by a program name or a keyword, and the selection confidence measure of the TV program selection support system are displayed in step 1511 with reference to the program recording schedule 1800, and then the program goes to step 1502. A query is made in step 1512 to see if it is desired to change the system program presetting method for the viewer program presetting method. If the response in step 1512 is affirmative, the contents in the corresponding section of the presetting method column 1806 of the program recording schedule 1800 is changed for the symbol representing the viewer program presetting method, and then the program goes to step 1502.

A query is made in step 1514 to see if the cancellation of a program preset for recording is desired. If the response in step 1514 is affirmative, the program is deleted from the program recording schedule 1800 in step 1515, and then the program goes to step 1502. The schedule decision program 1200 is started again after the completion of the program presetting program 1500, and the picture recording device 105 is noticed of the change in the program recording schedule 1800. A query is made in step 1516 to see if the viewer has completed a program preset operation and a preset program confirmation operation. If the response in step 1516 is affirmative, the program presetting program 1500 is ended in step 1517.

Figure 16:
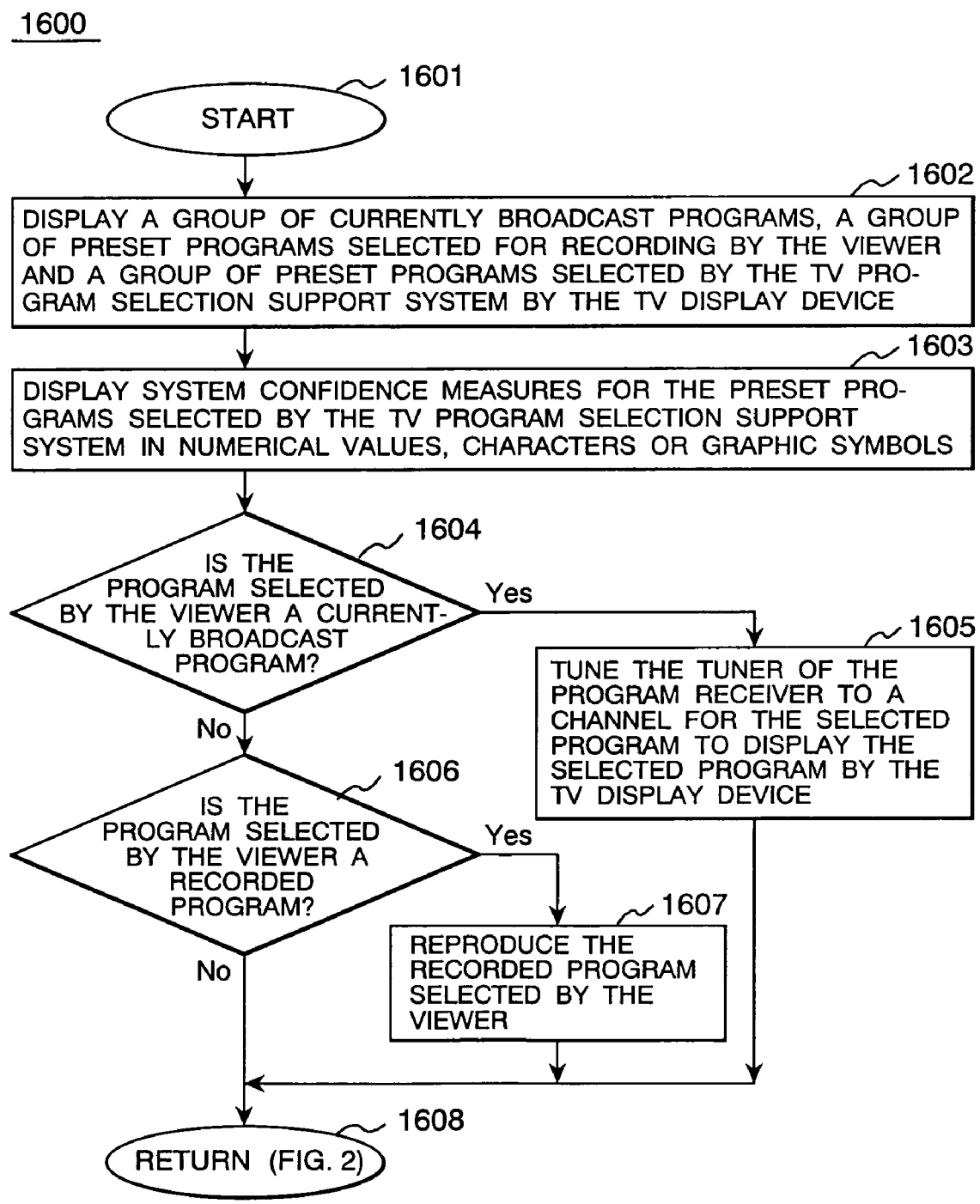
FIG. 16 is a view program selecting program to be carried out by the TV program selection support systems in the first and the second embodiments according to the present invention.

FIG. 16 is a flow chart of the view program selecting program 1600. The view program selecting program 1600 is executed when the viewer views a recorded program and a currently broadcast program. The view program selecting program 1600 is started by the viewer in step 1601. In step 1602, a group of currently broadcast programs, a group of preset programs selected for recording by the viewer and a group of preset programs selected by the TV program selection support system are displayed by the TV display device 104. In step 1603, system confidence measures for the preset programs selected by the TV program selection support system are expressed in numerical values, characters or graphic symbols. The viewer specifies a desired program among those displayed by the TV display device 104. If the viewer selects a currently broadcast program (step 1604), the tuner of the program receiver 102 is tuned to a channel for the selected program to display the selected program by the TV display device 104 in step 1605 and the program is ended in step 1608. If the viewer selects a recorded program (step 1606), the selected program is reproduced in step 1607, and then the program is ended in step 1608.

Figure 17:
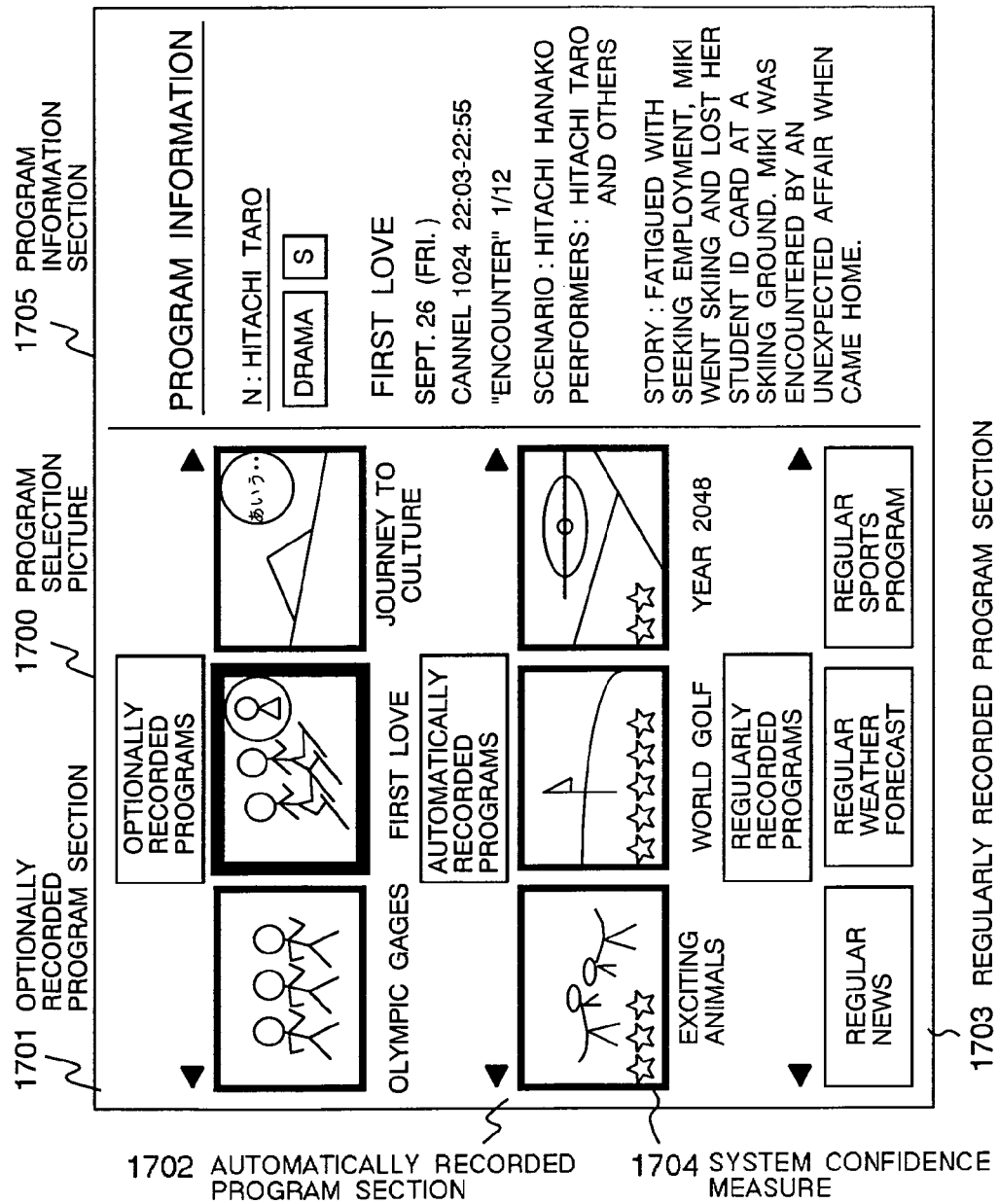
FIG. 17 is a pictorial view of a view program selecting program to be carried out by the TV program selection support systems in the first and the second embodiments according to the present invention displayed on a screen.

FIG. 17 is a pictorial view of a program selection picture 1700 for facilitating program selection by the viewer. Currently broadcast programs and recorded programs are displayed simultaneously in step 1602 of the view program selecting program 1600. Currently broadcast programs and recorded programs may be displayed in separate pictures, respectively. The program selection picture 1700 is an example of a view program selecting picture special for selecting a recorded program. A currently broadcast program selection mode or a recorded program selection mode is selected by a method using a picture prompting the viewer to select either the currently broadcast program selection mode or the recorded program selection mode or by a method using a mode selecting device provided with selector buttons and included in a general TV remote controller. When the recorded program selection mode is selected, the program selection picture 1700 is displayed on the TV display device 104.

The program selection picture 1700 comprises an optionally recorded program section 1701, an automatically recorded program section 1702, a regularly recorded program section 1703 and a program information section 1705. Parts of images of programs are displayed in thumbnails in the optionally recorded program section 1701 and the automatically recorded program section 1702. Images are displayed because the program selection picture 1700 is designed for video program selection. The contents of data programs broadcast by a digital broadcasting system can be displayed in graphic symbols instead of in images by using the program selection picture 1700. Programs previously selected for recording by the viewer are shown in the optionally recorded program section 1701. A graphic symbol shown in a program thumbnail and enclosed by a circle represents a presetting method in the presetting method column 1806 of the program recording schedule 1800. A graphic symbol of a man signifies a program preset for recording by specifying a person's name, and a graphic symbol of "abc . . . " signifies a program preset for recording by specifying a keyword. A thumbnail without any graphic symbol represents a program preset for recording by specifying a program. Programs selected for recording by the TV program selection support system are shown in the automatically recorded program section 1702. Stars in thumbnails represent system confidence measures 1704 determined on the basis of the results of analysis of viewer's preference.

The regularly recorded program section 1703 enables the viewer to view simply programs which the viewer views frequently. Images in the regularly recorded program section 1703 are modifications of images of programs specified by a program name, person's name or a keyword. In the regularly recorded program section 1703, "Regular News" is a program regularly broadcast through a fixed channel and recorded without fail; the viewer is able to view the latest news on this program. Effects of "Regular Weather Forecast" and "Regular Sports Program" are the same as those of "Regular News". It is effective to allocate a fixed recording capacity to each of the programs displayed in the regularly recorded program section 1703 and to delete the programs in order of sequence of recording. If programs to be displayed in the regularly recorded program section 1703 are preset for recording by specifying a particular person's name, only programs which a particular person concerns can be viewed.

Figure 21:
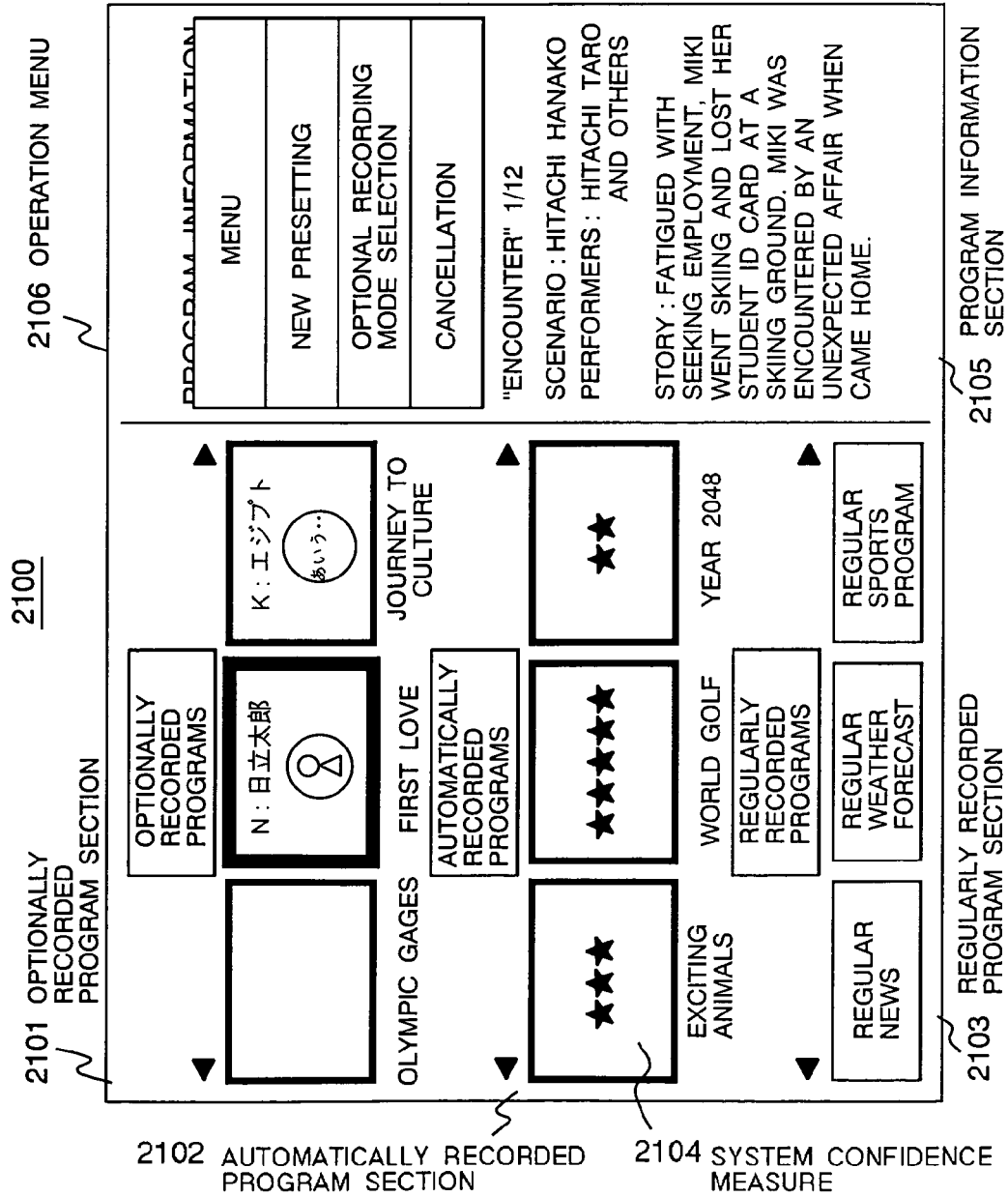
FIG. 21 is a pictorial view of a program recording schedule confirmation data displayed by the TV program selection support systems in the first to the third embodiments according to the present invention.

FIG. 21 shows a program recording schedule confirmation picture 2100. The program recording schedule confirmation picture 2100, similarly to the program selection picture 1700, comprises an optionally recorded program section 2101 showing programs selected for recording by the viewer, an automatically recorded program section 2102 showing programs selected for recording by the TV program selection support system, and a regularly recorded program section 2103. The automatically recorded program section 2102 represents a system indicated program presetting, and the star symbols indicated as 2104 represent a system confidence measure based upon the results of analysis of viewers' preference. When a preset program is selected, program information about the selected preset program is displayed in a program information section 2105. An operation menu 2106 can be displayed by operating a menu calling means included in an operating means 106 included in the TV program selection support system. The operation menu 2106 indicates "Presetting", "Optional presetting mode selection" and "Cancellation". A program automatically preset for recording shown in the automatically recorded program section 2102 can be changed into a program optionally preset for recording shown in the optionally recorded program section 2101. When an optionally recorded program is selected as shown in FIG. 21, "Optional presetting selection" cannot be selected.

The TV program selection support system selects programs presumed to be a viewer's favorite program from the program list, and shows in the automatically recorded program section 2102, and the program thus shown in the automatically recorded program section 2102 can easily be changed into a program to be shown in the optionally recorded program section 2101. Thus, the viewer is able to preset a desired program for recording without fail by a simple operation without minutely viewing the program list.

As is apparent from the foregoing description, according to the present invention, the TV program selection support system analyzes and learns the viewer's program preference when the viewer selects and views a favorite program, and proposes programs presumed to be viewer's favorite programs. Thus, the viewer is able to select a program suiting viewer's preference easily. The TV program selection support system records programs presumably suiting viewer's preference automatically to reduce troubles in the program presetting operation to be carried out by the viewer. Since the TV program selection support system deletes automatically on the basis of estimated preference the programs automatically recorded by the TV program selection support system, the viewer does not need to manage the recorded programs, and the viewer will virtually feel like selecting and viewing programs broadcast by an increased number of broadcasting stations.

Figure 22:
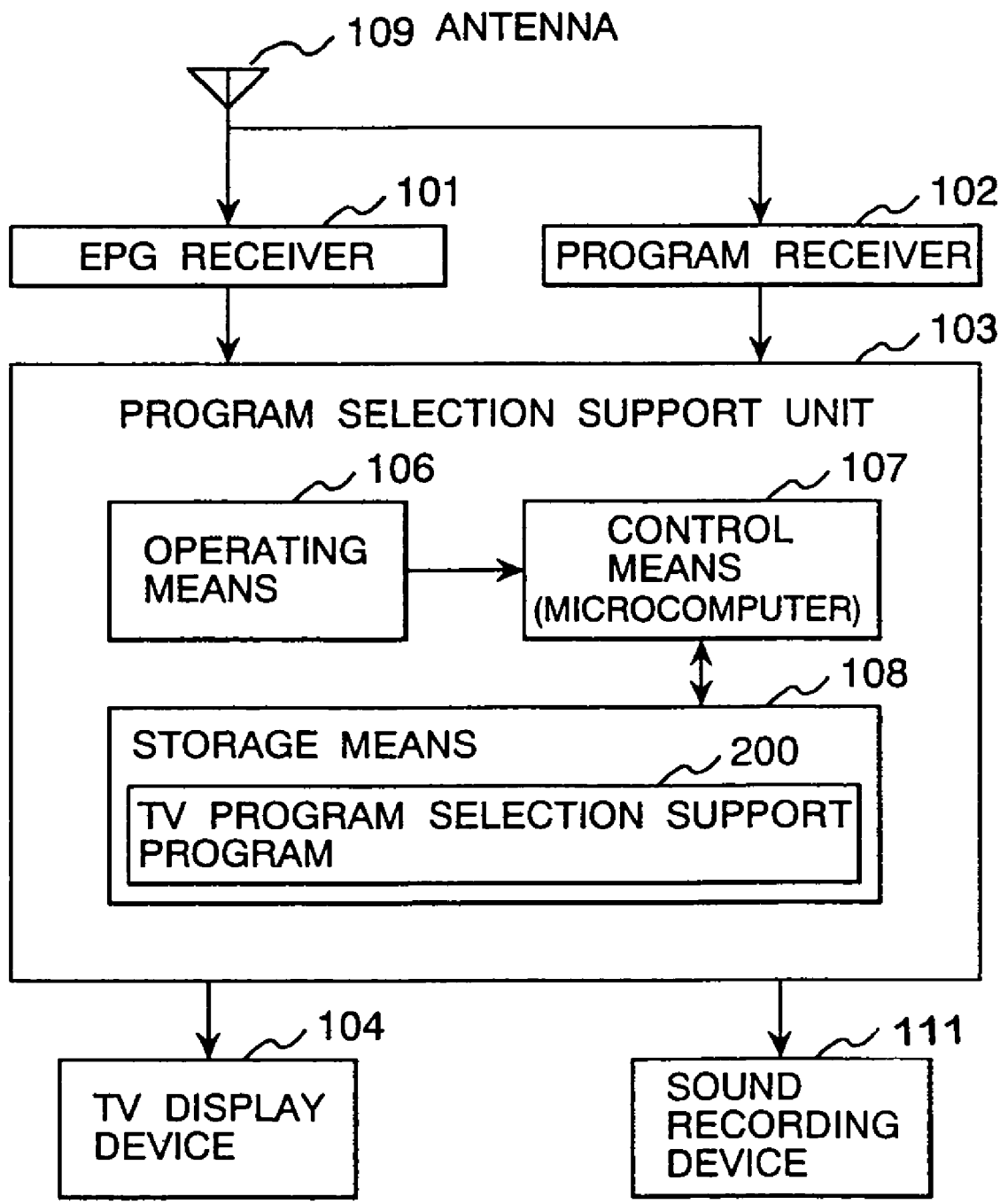
FIG. 22 is block diagram of the TV program selection support system in the second embodiment.

A TV program selection support system in a second embodiment according to the present invention will be described with reference to FIG. 22. As shown in FIG. 22, the TV program selection support system in the second embodiment is provided with a sound recording device 111 instead of the picture recording device 105 of the TV program selection support system in the first embodiment shown in FIG. 1. Audio programs are broadcast as well as video programs. The TV program selection support system selects, records and manages audio programs instead of video programs, and functions and effects thereof are the same as those of the TV program selection support system in the first embodiment.

Figure 23:
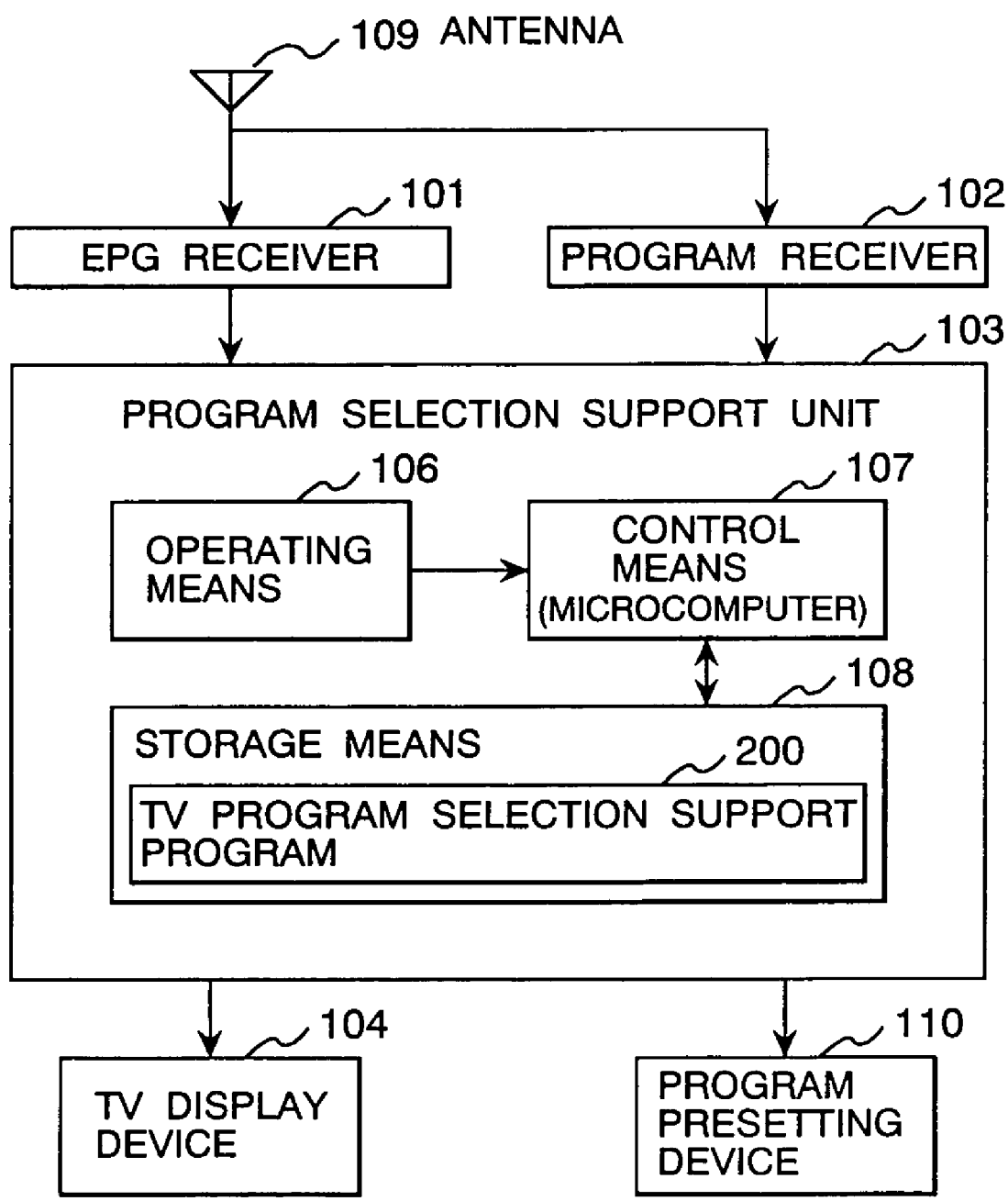
FIG. 23 is a block diagram of the TV program selection support system in the third embodiment.

A TV program selection support system in a third embodiment according to the present invention will be described with reference to FIG. 23. This TV program selection support system is not applied to program recording, but is applied to program presetting. As shown in FIG. 23, the TV program selection support system in the third embodiment is provided with a program presetting device 110 instead of the picture recording device 105 of the TV program selection support system in the first embodiment shown in FIG. 1. The third embodiment uses a program presetting schedule instead of the program recording schedule 1800 used by the first embodiment. This TV program selection support system does not record a program and starts displaying a preset program at set start time by a TV display device 104. When the viewer does not want to bother himself by selecting programs or wants to use television as a background music, the TV program selection support system selects programs presumably suiting viewer's preference for the viewer. The TV program selection support system, similarly to the TV program selection support system in the second embodiment, is capable of automatically selecting audio programs presumably suiting viewer's preference for the viewer.

Figure 24:
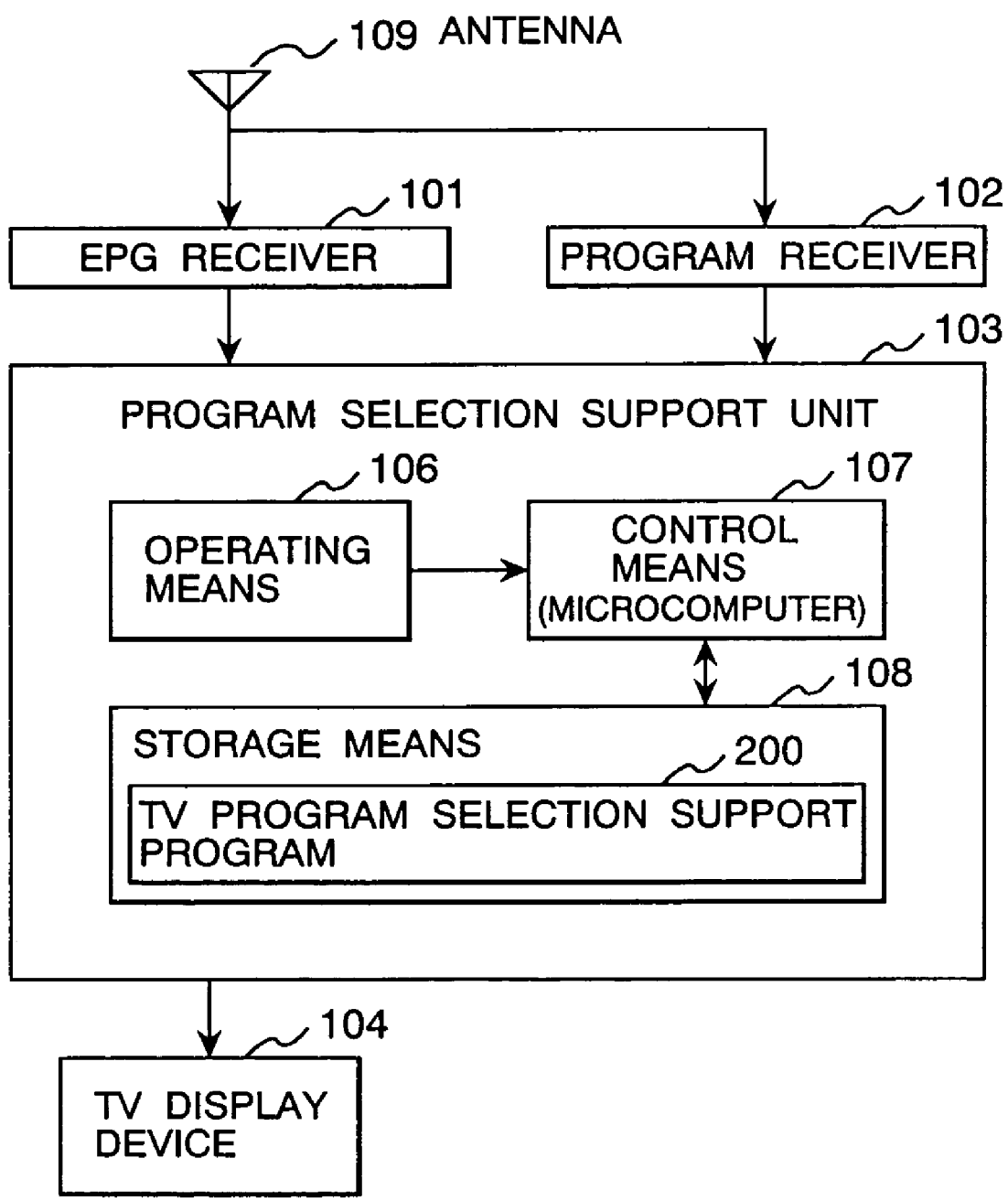
FIG. 24 is a is block diagram of the TV program selection support system in the fourth embodiment.
Figure 25:
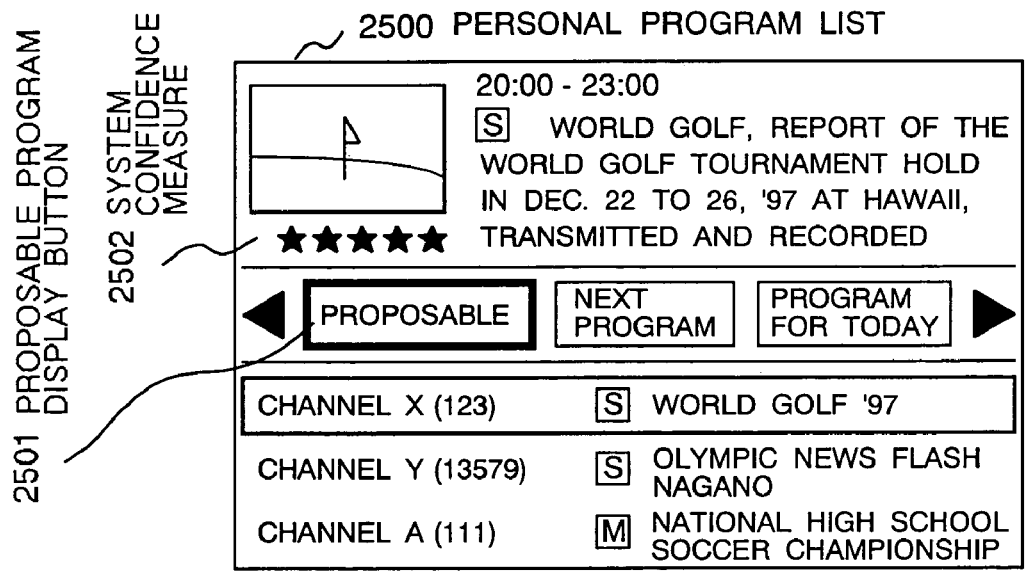
FIG. 25 is a pictorial view of a personal program list used by the TV program selection support system in the fourth embodiment.

A TV program selection support system in a fourth embodiment according to the present invention will be described with reference to FIG. 24. As shown in FIG. 24, the TV program selection support system in the fourth embodiment is substantially the same in configuration as the TV program selection support system in the first embodiment, except that the TV program selection support system in the fourth embodiment is not provided with any device corresponding to the picture recording device 105 of the TV program selection support system in the first embodiment shown in FIG. 1, and hence the schedule decision program 1200 and the program recording schedule 1800 are not used in the fourth embodiment. The program presetting program 1500 and the program presetting data 800 may be either omitted or not omitted. If the program presetting program 1500 and the program presetting data 800 are omitted, the TV program selection support system is able to select programs presumed to suit viewer's preference when the EPG is received and to display a program list specifying those programs as proposable programs. If the program presetting program 1500 and the program presetting data 800 are not omitted, programs including program names, person's names or keywords previously specified by the viewer can be displayed in the EPG in addition to indications included in the EPG. FIG. 25 shows, by way of example, a personal program list 2500 created taking into consideration viewer's preference. The viewer is able to make the TV program selection support system display sequentially programs presumed to suit viewer's preference by the TV program selection support system by operating a proposable program display button 2501. A star symbol 2502 in a lower part of a program section indicates a system confidence measure. The proposable programs are displayed sequentially in decreasing order of system confidence measure.

Figure 26:
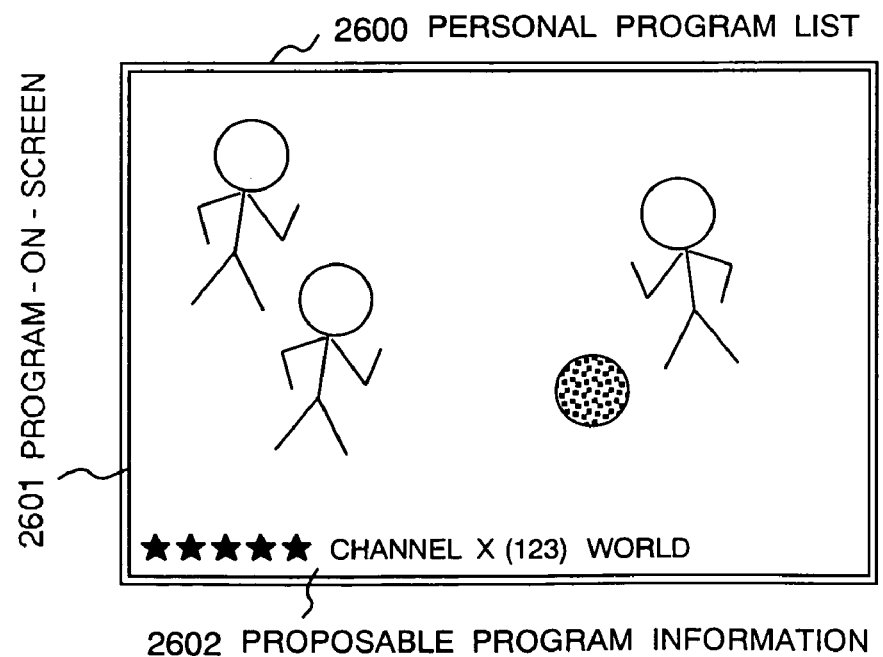
FIG. 26 is a pictorial view of a personal program table 2 displayed on a screen used by the TV program selection support system in the fourth embodiment.

FIG. 26 shows another personal program list 2600, in which a currently viewed program 2601 is displayed. When the viewer operates an operating means 106 to carry out an operation for displaying information about programs proposed by the TV program selection support system, the TV program selection support system calculates the preference measure of currently broadcast programs, and displays program information 2602 about the currently broadcast programs in decreasing order of preference measure by a television opaque projector. Thus, programs presumably suiting viewer's preference and program information can be provided. Consequently, the viewer is able to select easily a program suiting viewer's preference without exerting effort on selecting the program. It is expected that difficulty in selecting programs by a zapping operation is enhanced as the number of channels increases. However, since the number of channels can be limited by a means for displaying the proposable program information 2602, program selection by a zapping operation can be supported.

Figure 27:
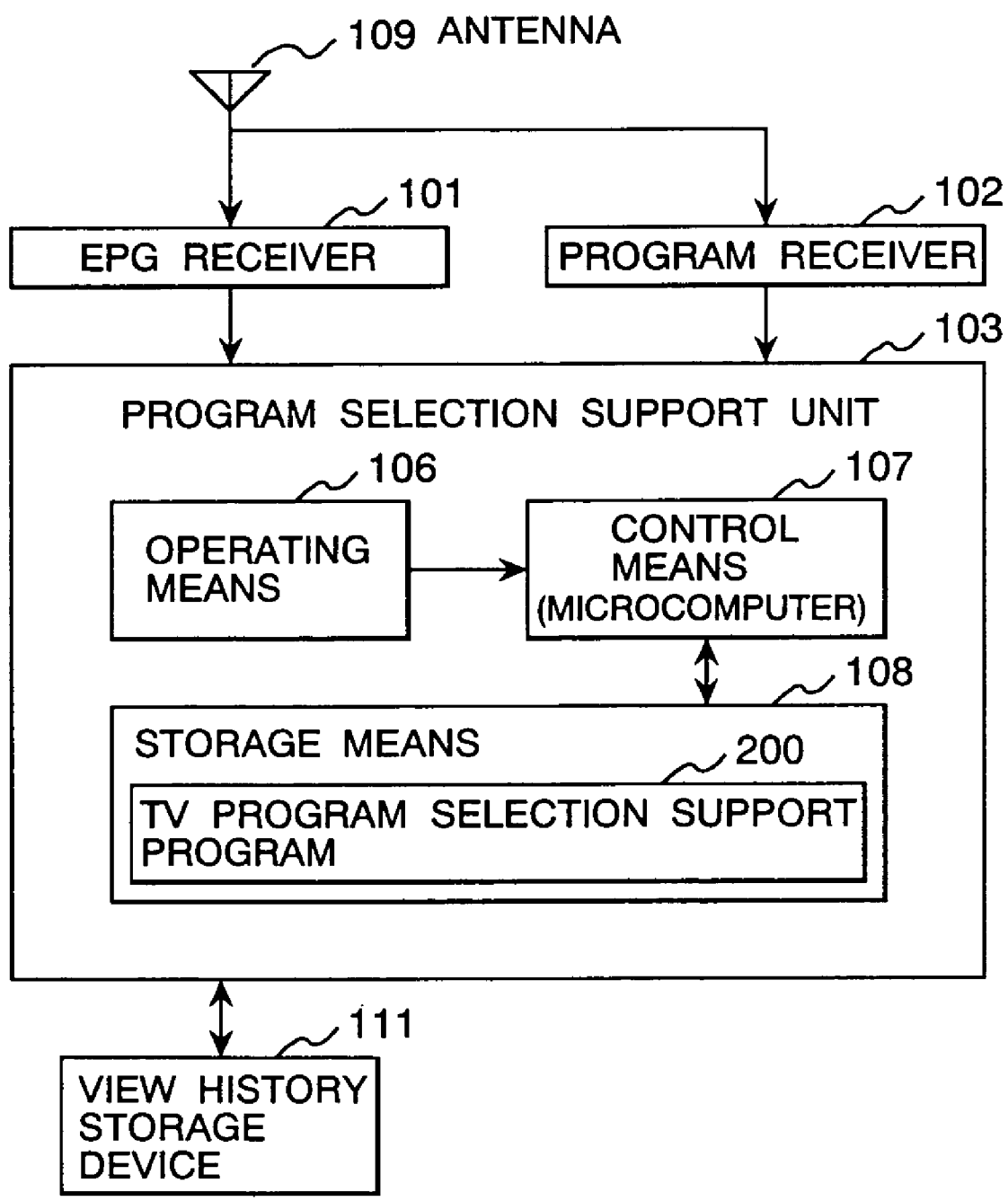
FIG. 27 is a block diagram of a TV program selection support system in a fifth embodiment according to the present invention.

A TV program selection support system in a fifth embodiment according to the present invention will be described with reference to FIG. 27. As shown in FIG. 27, the TV program selection support system is provided with a view history storage device 111, i.e., an external storage device, connected to a program selection support unit 103 to store the view element analysis table 600 shown in FIG. 6. The view history storage device 111 can be used in combination with another TV program selection support system provided with a program selection support unit similar to the program selection support unit 103. For example, when the viewer buys a new TV program selection support system, the viewer's preference need not be taught to the new TV program selection support system. If the view history storage device 111 is a portable device such as an IC card, the viewer is able to view an electronic program list suiting viewer's preference by using the view history storage device 111 in combination with a TV program selection support system available at a place where the viewer is staying while on a journey. If a plurality of external storage devices 111 can be connected to the program selection support unit 103, a new view element analysis table can be produced by integrating a plurality of view element analysis tables 600 provided by the plurality external storage device 111 or the plurality view element analysis tables 600 may be changed at fixed time intervals to produce a program schedule suiting preferences of a plurality of persons.

The foregoing embodiments have the following effects. Programs suiting viewer's preference are recorded automatically by using the picture recording means in combination with the program selection support unit. Since programs suiting viewer's preference can automatically be recorded, troublesome operations for presetting programs for recording are not necessary. Accordingly, the viewer is able to view easily TV programs which are not broadcast in time periods in which the viewer usually does not view television. Since programs frequently viewed by the viewer are recorded automatically, those programs can be viewed without fail even if the viewer should fail in presetting the programs for recording.

The effects of the present invention is available from a plurality of TV program selection support unit by using the external storage device storing the viewer's preference. If the viewer carries the external storage device, the viewer is able to enjoy viewing programs suiting viewer's preference while on a journey. If the TV program selection support system can be minimized and can be formed in a portable system by the progress of packaging technology, the viewer is able to enjoy viewing programs suiting viewer's preference and selected from an electronic program table while on a journey. A program schedule meeting the preferences of a plurality of persons can be produced by connecting a plurality of external storage devices to the program selection support unit.

The preference of the viewer for programs is extracted by analyzing the electronic program table, which is called EPG in this specification, and the view history of the viewer, programs presumably suiting viewer's preference are selected from programs to be broadcast, and the selected programs are proposed to the viewer. Since the view history representing the view tendency of the viewer is used, the viewer need not enter data on viewer's preference, and the viewer is only to view TV programs. Consequently, the viewer is able to select programs suiting viewer's preference easily without changing usual TV program viewing method.

What is claimed is:

1. An apparatus for presetting a program, and for recording the preset program, comprising:
    a receiver for receiving a program;
    a receiver for receiving an electronic program guide for said program;
    an input module for inputting a first program information indicated by a user to record and for inputting at least one of a genre, a program name, a keyword, and person's name, which are indicated by said user;
    a retrieving module for retrieving based on the electronic program guide, second program information which matches at least one of said genre, program name, keyword and person's name;
    a presetting module for presetting said first program information and said second program information;
    a recording module for recording on a recording medium, a program received by said receiver in accordance with a result of the presetting performed by said presetting module;
    a deleting module for deleting said program from said recording medium;

wherein, when a plurality of programs overlap to record at the same time, said recording module preferentially records the program of said first program information, rather than said second program information;

the presetting module limits recording capacity of said recording medium by at least one input item of said genre, program name, keyword and person's name; and the deleting module deletes the program of said older second program information from said recording medium in said limited recording capacity;

a monitoring module for monitoring a view time period of a program which said viewer has viewed;

a storage device for storing the viewing history information which includes a view score obtained by dividing a view time period by a program time period of said user, and at least one analysis information of a total view score of view elements and a specific view score obtained by dividing the total view score by the number of programs corresponding to the view elements; and an analyzing module for analyzing preference of said user to each program which is represented by said specific view score that includes a weighted program view measure obtained by multiplying a program view measure by its weight, the preference being calculated according to said viewing history information and said analysis information;

wherein said retrieving module retrieves a third program information which matches said program which said user prefers as a result of the analysis performed by said analyzing module, in accordance with said electronic program guide; and when a plurality of programs overlap to record at the same time, the recording module preferentially records the program of said first program information, rather than said second and said third program information.

2. An apparatus according to claim 1, wherein, when a plurality of programs overlap at the same time, said presetting module presets said second program information, except the time period of said first program information.

3. An apparatus according to claim 1, wherein said deleting module preferentially deletes a program which said viewer viewed at least once, rather than other programs, among the programs recorded on said recording medium.

4. An apparatus according to claim 1, wherein said deleting module deletes a program recorded on said recording medium, when the time length of the preset program preset by said presetting module, is longer than the recordable time length of said recording medium, upon comparison between said recordable time length of said recording medium and said time length of the program preset by the presetting module.

5. An apparatus according to claim 1, wherein said deleting module preferentially deletes the program of said third program information rather than other programs, among the programs recorded on said recording medium.

6. An apparatus according to claim 1, wherein said view element includes a genre or sub genre, a time, a time period, a day, a person's name, a sound and language, a serial number, a keyword hit point, a price and a channel.

7. An apparatus for presetting a program, and for recording said preset program, comprising:

a receiver for receiving a program;

a receiver for receiving an electronic program guide for said program;

an input module for inputting a first program information indicated by a user to record;

a monitoring module for monitoring a view time period of a program which said user has viewed;

a storage device for storing the viewing history information, which includes a view score obtained by dividing a view time period by a program time period of said user and at least one analysis information of a total view score of view elements and a specific view score obtained by dividing the total view score by the number of programs corresponding to the view elements;

an analyzing module for analyzing preference of said user to each program which is represented by said specific view score that includes a weighted program view measure obtained by multiplying a program view measure by its weight, the preference being calculated according to said viewing history information and said analysis information;

a retrieving module for retrieving a second program information which matches the preference of said user as a result of the analysis performed by said analyzing module, in accordance with said electronic program guide;

a presetting module for presetting said first program information, and said second program information;

a recording module for recording on a recording medium, a program received by said receiver, in accordance with the result of the presetting performed by said presetting module; and a deleting module for deleting, from said recording medium, a program that has been recorded on said recording medium if the preference of the user to a program that has already been recorded on said recording medium is lower than the preference of said user to a program that is going to be preset by said presetting module, upon comparison between the preference of said user to the program that has been recorded on said recording medium and the preference of said user to the program that is going to be preset by said presetting module;

wherein, said presetting module cancels the preset of the program that is going to be preset by said presetting module if the preference of said user to the program that is going to be preset by said presetting module is lower than the preference of said user to the program that has already been recorded on said recording medium.

8. An apparatus according to claim 7, wherein said deleting module preferentially deletes a program which said user viewed at least once, rather than other programs, among the programs recorded on said recording medium.

9. An apparatus according to claim 7, wherein said deleting module deletes a program already recorded on said recording medium, when the time length of the program preset by said presetting module, is longer than the recordable time length of said recording medium, upon comparison between the recordable time length of said recording medium and said time length of said program preset by said presetting module.

10. An apparatus according to claim 7, comprising:

said input module further for inputting at least one of a genre, a program name, a keyword, and a person's name, which are indicated by said user;

wherein, said retrieving module retrieves a third program information that matches at least one of said genre, program name, keyword and a person's name, in accordance with said electronic program guide; and when a plurality of programs overlap to record at the same time, the recording module preferentially records the program of said first program information, rather than said second and said third program information.

11. An apparatus according to claim 10, wherein said deleting module preferentially deletes a program of said third program information, rather than other programs, among the programs already recorded on said recording medium.

12. An apparatus according to claim 10, wherein when a plurality of programs overlap at the same time, said recording module preferentially presets the programs of the first program information rather than the program of said second program information.

13. An apparatus according to claim 12, wherein, when a plurality of programs overlap at the same time, the presetting module presets said second program information, except the time period of said first program information.

14. An apparatus according to claim 10, wherein said deleting module deletes a program that has not been viewed by the user for a predetermined time or longer from the recording medium.

15. An apparatus according to claim 10,
wherein said viewing history includes viewing time of each program by said user; and
said analyzing module calculates values by dividing said viewing time by the time of a program and analyzes the preference of said user based on the value calculated by dividing said viewing time by the time of the program.

16. An apparatus according to claim 7, wherein said view element includes a genre or sub genre, a time, a time period, a day, a person's name, a sound and language, a serial number, a keyword hit point, a price and a channel.

17. An apparatus for recording a program, and for displaying said program, comprising:
a receiver for receiving a program;
a receiver for receiving an electronic program guide for said program;
an input module for inputting a first program information indicated by a user to record;
a display device for displaying a program received by said program receiver;
a monitoring module for monitoring a view time period of a program which said user has viewed;
a storing device for storing the viewing history information, which includes a view score obtained by dividing a view time period by a program time period of said user and at least one analysis information of a total view score of view elements and a specific view score obtained by dividing the total view score by the number of programs corresponding to the view elements;
an analyzing module for analyzing preference of said user to each program which is represented by said specific view score that includes a weighted program view measure obtained by multiplying a program view measure by its weight, the preference being calculated according to said viewing history information and said analysis information;
a retrieving module for retrieving a second program information which matches said program which said user prefers as a result of the analysis performed by said analyzing module, in accordance with the electronic program guide;
a presetting module for presetting said first program information, and said second program information;
a recording module for recording on a recording medium, a program received by said receiver, in accordance with the result of the presetting performed by said presetting module; and
a deleting module for deleting, from said recording medium, a program that has been recorded on said recording medium if the preference of the user to a program that has already been recorded on said recording medium is lower than the preference of said user to a program that is going to be preset by said presetting module, upon comparison between the preference of said user to the program that has been recorded on said recording medium and the preference of said user to the program that is going to be preset by said presetting module;
wherein, the display device displays said program recorded on said recording medium in accordance with an indication of the user; and
the presetting module cancels the preset of the program that is going to be preset by said presetting module if the preference of said user to the program that is going to be preset by said presetting module is lower than the preference of said user to the program that has already been recorded on said recording medium.

18. An apparatus according to claim 17, wherein said view element includes a genre or sub genre, a time, a time period, a day, a person's name, a sound and language, a serial number, a keyword hit point, a price and a channel.

19. An apparatus for presetting, and for recording said preset program, comprising:
a receiver for receiving a program;
a receiver for receiving an electronic program guide for said program;
an input module for inputting a first program information indicated by a user to record;
a monitoring module for monitoring a view time period of a program which said user has viewed;
a storage device for storing the viewing history information, which includes a view score obtained by dividing a view time period by a program time period of said user and at least one analysis information of a total view score of view elements and a specific view score obtained by dividing the total view score by the number of programs corresponding to the view elements;
an analyzing module for analyzing preference of said user to each program which is represented by said specific view score that includes a weighted program view measure obtained by multiplying a program view measure by its weight, the preference being calculated according to said viewing history information and said analysis information;
a retrieving module for retrieving a second program information which matches the preference of said user as a result of the analysis performed by said analyzing module, in accordance with said electronic program guide;
a presetting module for presetting said first program information, and said second program information; and
a recording module for recording on a recording medium, a program received by said receiver, in accordance with the result of the presetting performed by said presetting module;
wherein, said presetting module presets said first program information and said second program information in first and second presetting groups respectively;
said presetting module changes said second program information from said second presetting group to said first presetting group corresponding to an indication for a change by said user; and
when a plurality of programs overlap at the same time, said recording module preferentially presets the program of said first program information rather than the program of said second program information.

20. An apparatus according to claim 19, wherein said view element includes a genre or sub genre, a time, a time period, a day, a person's name, a sound and language, a serial number, a keyword hit point, a price and a channel.

21. An apparatus for presetting a program, and for recording said preset program, comprising:

a receiver for receiving a program;

a display device for displaying said program received by said receiver;

a receiver said receiving an electronic program guide for said program;

an input module for inputting a first program information indicated by a user to record;

a monitoring module for monitoring a view time period of a program which said user has viewed;

a storage device for storing the viewing history information including a view score obtained by dividing a view time period by a program time period of said user and at least one analysis information of a total view score of view elements and a specific view score obtained by dividing the total view score by the number of programs corresponding the view elements;

an analyzing module for analyzing preference of said user to each program which is represented by said specific view score and a weighted program view measure obtained by multiplying a program view measure by its weight, according to said viewing history information and said analysis information;

a retrieving module for retrieving a second program information which matches the preference of said user as a result of the analysis performed by said analyzing module, in accordance with said electronic program guide;

a presetting module for presetting said first program information, and said second program information; and a recording module for recording on a recording medium, a program received by said receiver, in accordance with the result of the presetting performed by said presetting module;

wherein, said display device displays the program recorded on said recording medium in accordance with an indication of said user;

said display device displays the results of presetting by said presetting module;

said presetting module presets said first program information and said second program information in first and second presetting groups respectively;

said presetting module changes said second program information from said second presetting group to said first presetting group corresponding to an indication for a change by the user; and when a plurality of programs overlap at the same time, said recording module preferentially presets the program of said first program information rather than the program of said second program information.

22. An apparatus according to claim 21, wherein said view element includes a genre or sub genre, a time, a time period, a day, a person's name, a sound and language, a serial number, a keyword hit point, a price and a channel.

* * * * *